(12) United States Patent
Hwang et al.

(10) Patent No.: US 11,145,859 B2
(45) Date of Patent: Oct. 12, 2021

(54) METAL OXIDE NANOSHEET-SULFUR NANOCOMPOSITE AND LITHIUM-SULFUR BATTERY USING THE SAME

(71) Applicant: EWHA UNIVERSITY—INDUSTRY COLLABORATION FOUNDATION, Seoul (KR)

(72) Inventors: Seong-Ju Hwang, Seoul (KR); Patil Sharad Bandu, Seoul (KR)

(73) Assignee: EWHA UNIVERSITY—INDUSTRY COLLABORATION FOUNDATION, Seoul (KR)

(*) Notice: Subject to any disclaimer, the term of this patent is extended or adjusted under 35 U.S.C. 154(b) by 0 days.

(21) Appl. No.: 16/234,646

(22) Filed: Dec. 28, 2018

(65) Prior Publication Data

US 2019/0173080 A1 Jun. 6, 2019

Related U.S. Application Data

(63) Continuation of application No. PCT/KR2018/012633, filed on Oct. 24, 2018.

(30) Foreign Application Priority Data

Oct. 27, 2017 (KR) ........................ 10-2017-0141469

(51) Int. Cl.
| | |
|---|---|
| *H01M 10/052* | (2010.01) |
| *H01M 4/36* | (2006.01) |
| *H01M 4/38* | (2006.01) |
| *H01M 4/48* | (2010.01) |
| *H01M 4/58* | (2010.01) |
| *H01M 4/136* | (2010.01) |
| *H01M 4/02* | (2006.01) |

(52) U.S. Cl.
CPC .......... *H01M 4/366* (2013.01); *H01M 4/136* (2013.01); *H01M 4/38* (2013.01); *H01M 4/483* (2013.01); *H01M 4/58* (2013.01); *H01M 10/052* (2013.01); *H01M 2004/028* (2013.01)

(58) Field of Classification Search
None
See application file for complete search history.

(56) References Cited

FOREIGN PATENT DOCUMENTS

| | | | |
|---|---|---|---|
| CN | 103872299 A | * | 6/2014 |
| KR | 1020040013904 A | | 2/2004 |
| KR | 1020160051574 A | | 5/2016 |
| KR | 20170022941 A | * | 3/2017 |
| KR | 1020170022941 A | | 3/2017 |

OTHER PUBLICATIONS

Seung Mi Oh. "Improvement of Na Ion Electrode Activity of Metal Oxide via Composite Formation with Metal Sulfide." American Chemical Society Appl. Mater. Interfaces (Year: 2016).*

(Continued)

*Primary Examiner* — Haroon S. Sheikh
(74) *Attorney, Agent, or Firm* — Hamre, Schumann, Mueller & Larson, P.C.

(57) ABSTRACT

The present disclosure relates to a metal oxide nanosheet-sulfur nanocomposite containing sulfur nanoparticles grown directly on each of exfoliated metal oxide nanosheets, and a lithium-sulfur battery including a sulfur cathode containing the metal oxide nanosheet-sulfur nanocomposite.

7 Claims, 27 Drawing Sheets

(56) References Cited

OTHER PUBLICATIONS

Han-Chi Wang, et al., "Oxygen-Deficient Titanium Dioxide Nanosheets as More Effective Polysulfide Reservoirs for Lithium-Sulfur Batteries," Chemistry—A European Journal 23, 40, pp. 9666-9673, May 16, 2017.

Zhen Li, et al., "A sulfur host based on titanium monoxide@carbon hollow spheres for advanced lithium-sulfur batteries," Nature Communications, 11 pages, Oct. 20, 2016.

* cited by examiner

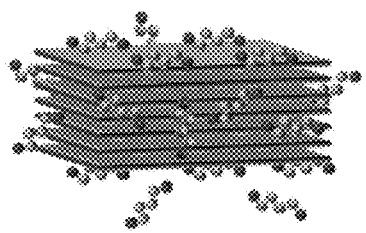
FIG. 1A(i)
Layered
FIG. 1A(ii)
Exfoliated nanosheet
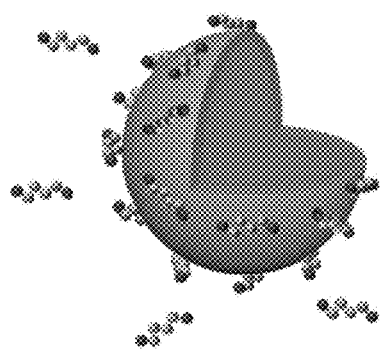
FIG. 1A(iii)
Nanoparticle
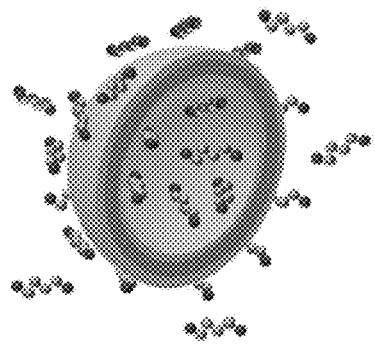
FIG. 1A(iv)
Hollow microsphere
- Lithium polysulfide (LiPS)
- Inaccessible pat for LiPS

FIG. 2B(iii)

FIG. 2C(iii)

FIG. 2C(iv)

METAL OXIDE NANOSHEET-SULFUR NANOCOMPOSITE AND LITHIUM-SULFUR BATTERY USING THE SAME

CROSS-REFERENCE TO RELATED APPLICATIONS

This application is a continuation of PCT Application No. PCT/KR2018/012633, filed on Oct. 24, 2018, which claims priority to Korean Patent Application Number 10-2017-0141469, filed on Oct. 27, 2017, both of which are hereby incorporated by reference in their entirety.

TECHNICAL FIELD

The present disclosure relates to a metal oxide nanosheet-sulfur nanocomposite containing sulfur nanoparticles grown directly on each of exfoliated metal oxide nanosheets, and a lithium-sulfur battery including a sulfur cathode containing the metal oxide nanosheet-sulfur nanocomposite.

BACKGROUND

The ever-increasing demand for electrochemical energy storage systems to power green sustainable transportation represented by electric vehicles and drones has evoked a great deal of research activity for rechargeable lithium-sulfur (Li—S) batteries because of their high theoretical specific energy density (2567 Wh $kg^{-1}$). Although there have recently been significant advances in Li—S batteries [S. Evers, L. F. Nazar, Acc. Chem. Res., 2012, 46, 1135.], the low efficiency of sulfur utilization and rapid capacity fading caused by the dissolution of lithium polysulfide (LiPS) and uncontrolled deposition of $Li_2S$ leave the above-described technology lingering at a premature research stage [A. Manthiram, Y. Fu, Y.-S. Su, Acc. Chem. Res., 2012, 46, 1125.]. In particular, the "shuttling" effect of LiPS results in the loss of active material from the cathode and destabilizes the interface at the Li metal anode, leading to low Coulombic efficiency (CE) in each cycle.

From an electrode design viewpoint, the confinement of LiPS has been most widely pursued to suppress the dissolution of LiPS. Along this direction, physical encapsulation of elemental sulfur in porous carbonaceous host structures with high surface areas is representative. However, weak interaction between nonpolar carbonaceous hosts and polar LiPS is limited in its ability to hold LiPS within the sulfur cathodes. In an effort to overcome this flaw, the carbonaceous host materials were modified with hetero-atom doping and surface functionalization. In contrast with the carbonaceous hosts, homologues with polar surface characteristics are more effective in suppressing the shuttling process owing to enhanced electrostatic interaction between hosts and LiPS. Accordingly, diverse polar inorganic materials such as $In_{1-x}Sn_xO_2$, $SiO_2$, $BaTiO_3$, $VO_2$, $Nb_2O_5$, $MnO_2$, MgO, $TiS_2$, $CoS_2$, $WS_2$, $Co_9S_8$, $ZrO_2$, MXene, metal organic frameworks, and metal hydroxides have been introduced in sulfur cathodes because LiPS can be readily adsorbed. Among these transition metal-containing compounds, $TiO_2$ is unique in its strong affinity with LiPS, low material cost, and environmentally benign nature. Not only has $TiO_2$ been reported to have different morphologies or reduced inverse opal structures, but its derivatives with different compositions including heteroatom-doped hollow spheres, magneli $Ti_4O_7$ and $Ti_6O_{11}$ phases, and titanium monoxide have also been employed for sulfur cathodes. Despite their promising role in the efficient entrapment of LiPS, a majority of the available approaches that have adopted OD nanoparticle or OD hollow sphere morphologies for titanium oxides have only been validated for sulfur contents below 70 parts by weight.

DISCLOSURE OF THE INVENTION

Problems to be Solved by the Invention

The present disclosure provides a metal oxide nanosheet-sulfur nanocomposite containing sulfur nanoparticles grown directly on each of exfoliated metal oxide nanosheets, and a lithium-sulfur battery including a sulfur cathode containing the metal oxide nanosheet-sulfur nanocomposite.

However, problems to be solved by the present disclosure are not limited to the above-described problems, and although not described herein, other problems to be solved by the present disclosure can be clearly understood by those skilled in the art from the following descriptions.

Means for Solving the Problems

A first aspect of the present disclosure provides a metal oxide nanosheet-sulfur nanocomposite, containing sulfur nanoparticles grown directly on each of exfoliated metal oxide nanosheets.

A second aspect of the present disclosure provides a lithium-sulfur battery including a sulfur cathode containing the metal oxide nanosheet-sulfur nanocomposite according to the first aspect of the present disclosure.

Effects of the Invention

According to embodiments of the present disclosure, there is provided a metal oxide nanosheet-sulfur nanocomposite containing exfoliated 2D lepidocrocite titanium oxide nanosheet as a component for sulfur cathodes to suppress polysulfide dissolution markedly.

According to embodiments of the present disclosure, in the metal oxide nanosheet-sulfur nanocomposite, the exfoliated 2D metal oxide nanosheets with Lewis acidity can effectively suppress LiPS dissolution even at a high sulfur content of 80 parts by weight or more, leading to decent cyclability such as capacity retention.

In the metal oxide nanosheet-sulfur nanocomposite according to embodiments of the present disclosure, the Lewis acidity originating from under-coordinated Ti species as well as the large surface area associated with the 2D structure can endow 2D lepidocrocite metal oxide (e.g., titanium oxide) with the efficient interaction with LiPS. As a result, the Li—S cell with a sulfur content of 80 parts by weight can exhibit 1023.5 mA h $g^{-1}$ at 0.05 C rate and a capacity retention of 82.3% after 300 cycles measured at 1 C rate, and the considerably improved cycling performance can provide useful insight for designing sulfur cathodes, that is, the incorporation of acidic 2D metal oxide nanosheets.

BRIEF DESCRIPTION OF THE DRAWINGS

FIG. 1A(i) is a schematic illustration of LiPS adsorption on the surfaces of various titanium oxide morphologies including the bulk layered according to the conventional art.

FIG. 1A(ii) is a schematic illustration of LiPS adsorption on the surfaces of various titanium oxide morphologies including exfoliated nanosheets according to the conventional art.

FIG. 1A(iii) is a schematic illustration of LiPS adsorption on the surfaces of various titanium oxide morphologies including nanoparticles according to the conventional art.

FIG. 1A(iv) is a schematic illustration of LiPS adsorption on the surfaces of various titanium oxide morphologies including hollow spheres according to the conventional art.

FIG. 1B(ii) is a crystal structures of titanium oxide nanosheets [trititanate-type titanium oxide (TT)] according to the conventional art.

FIG. 2B(ii) shows a FE-SEM micrograph of the titanium oxide-sulfur nanocomposites (scale bar: 1 μm) according to an example of the present disclosure.

FIG. 2B(iii) shows a FE-SEM micrograph of the titanium oxide-sulfur nanocomposites (scale bar: 1 μm) according to an example of the present disclosure.

FIG. 2B(iv) shows a FE-SEM micrograph of the titanium oxide-sulfur nanocomposites (scale bar: 1 μm) according to an example of the present disclosure.

FIG. 2C(ii) shows a TEM micrograph of the same nanocomposites (scale bar: 200 nm) according to an example of the present disclosure.

FIG. 2C(iii) shows a TEM micrograph of the same nanocomposites (scale bar: 200 nm) according to an example of the present disclosure.

FIG. 2C(iv) shows a TEM micrograph of the same nanocomposites (scale bar: 200 nm) according to an example of the present disclosure.

FIG. 12A was measured at 0.05 C (1 C=1,000 mA $g^{-1}$).

FIG. 12B was measured at 1 C.

FIG. 12C was measured at 0.05 C (1 C=1,000 mA $g^{-1}$).

FIG. 12D were measured at 1 C.

FIG. 15A shows the first discharge profile.

FIG. 15B shows S 2p branches at (i) pristine state and (ii) discharged state at 2.15 V, and (iii) discharged state at 1.7 V.

FIG. 15C shows Ti 2p branches at (i) pristine state and (ii) discharged state at 2.15 V.

BEST MODE FOR CARRYING OUT THE INVENTION

Figure 1B:
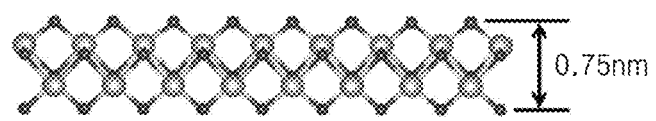
FIG. 1B(i) is a crystal structures of titanium oxide nanosheets [lepidocrocite-type titanium oxide (LT)] according to the conventional art.
Figure 1B:
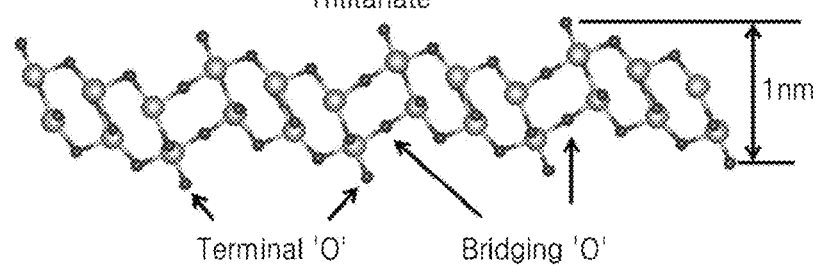

Hereinafter, embodiments and examples of the present disclosure will be described in detail with reference to the accompanying drawings so that the present disclosure may be readily implemented by those skilled in the art. However, it is to be noted that the present disclosure is not limited to the embodiments and examples but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the another element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "about or approximately" or "substantially" are intended to have meanings close to numerical values or ranges specified with an allowable error and intended to prevent accurate or absolute numerical values disclosed for understanding of the present disclosure from being illegally or unfairly used by any unconscionable third party.

Through the whole document, the term "step of" does not mean "step for".

Through the whole document, the term "combination(s) of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

Hereinafter, embodiments of the present disclosure will be described in detail, but the present disclosure may not be limited thereto.

A first aspect of the present disclosure provides a metal oxide nanosheet-sulfur nanocomposite, containing sulfur nanoparticles grown directly on each of exfoliated metal oxide nanosheets.

In an embodiment of the present disclosure, in a lithium-sulfur (Li—S) battery, a metal oxide nanosheet-sulfur nanocomposite containing the exfoliated metal oxide nanosheet is provided as a component for sulfur cathodes to suppress polysulfide dissolution markedly.

In an embodiment of the present disclosure, the exfoliated metal oxide nanosheets may provide a nanosheet of metal oxide selected from the group consisting of Co, Cu, Zn, Mn, Ti, V, Mo, Zn, and combinations thereof.

In an embodiment of the present disclosure, the exfoliated metal oxide nanosheets may include a nanosheet of titanium oxide such as lepidocrocite, trititanate, tetratitanate, or pentatitanate.

For example, if the metal oxide is a titanium oxide, the exfoliated titanium oxide nanosheets lead to the separation of the layered crystal lattice into individual monolayers through a soft-chemical exfoliation and the resulting single crystalline nanosheets have well-ordered surface structures originating from the interlayer structures of the original bulk host, and, thus, the surface structure of the exfoliated titanium oxide nanosheets can be tailored as a titanium oxide nanosheet having an exfoliated lepidocrocite crystal structure by altering the crystal structure of the original bulk counterpart.

In an embodiment of the present disclosure, the sulfur content may be about at least 80 parts by weight based on about 100 parts by weight of the metal oxide nanosheet-sulfur nanocomposite. For example, the sulfur content may be from about 80 parts by weight to about 95 parts by weight, from about 80 parts by weight to about 90 parts by weight, from about 80 parts by weight to about 88 parts by weight, from about 80 parts by weight to about 86 parts by weight, from about 80 parts by weight to about 84 parts by weight, from about 80 parts by weight to about 82 parts by weight, from about 82 parts by weight to about 95 parts by weight, from about 84 parts by weight to about 95 parts by weight, from about 86 parts by weight to about 95 parts by weight, from about 88 parts by weight to about 95 parts by weight, or from about 90 parts by weight to about 95 parts by weight based on about 100 parts by weight of the metal oxide nanosheet-sulfur nanocomposite, but may not be limited thereto. As the sulfur content is increased, a battery with a higher energy density can be manufactured.

A second aspect of the present disclosure provides a lithium-sulfur battery including a sulfur cathode containing the metal oxide nanosheet-sulfur nanocomposite according to the first aspect of the present disclosure.

In an embodiment of the present disclosure, the lithium-sulfur battery may include an anode located within an electrolyte and the sulfur cathode placed facing the anode.

In an embodiment of the present disclosure, the anode may include a member selected from the group consisting of a lithium-containing compound, a lithium metal, a lithium alloy, and combinations thereof, but may not be limited thereto.

In an embodiment of the present disclosure, the metal oxide nanosheet-sulfur nanocomposite may contain sulfur nanoparticles grown directly on exfoliated metal oxide nanosheets.

In an embodiment of the present disclosure, the exfoliated metal oxide nanosheets may include a nanosheet of titanium oxide such as lepidocrocite trititanate, tetratitanate, or pentatitanate.

In an embodiment of the present disclosure, the sulfur content may be at least 80 parts by weight based on 100 parts by weight of the metal oxide nanosheet-sulfur nanocomposite. For example, the sulfur content may be from about 80 parts by weight to about 95 parts by weight, from about 80 parts by weight to about 90 parts by weight, from about 80 parts by weight to about 88 parts by weight, from about 80 parts by weight to about 86 parts by weight, from about 80 parts by weight to about 84 parts by weight, from about 82 parts by weight to about 82 parts by weight, from about 82 parts by weight to about 95 parts by weight, from about 84 parts by weight to about 95 parts by weight, from about 86 parts by weight to about 95 parts by weight, from about 88 parts by weight to about 95 parts by weight, or from about 90 parts by weight to about 95 parts by weight based on about 100 parts by weight of the metal oxide nanosheet-sulfur nanocomposite, but may not be limited thereto. As the sulfur content is increased, a battery with a higher energy density can be manufactured.

In an embodiment of the present disclosure, dissolution of lithium polysulfide in the lithium-sulfur battery may be suppressed by the metal oxide nanosheet-sulfur nanocomposite.

The metal oxide nanosheet-sulfur nanocomposite according to an embodiment of the present disclosure can exhibit decent cyclability such as capacity retention because the exfoliated 2D metal oxide nanosheets with Lewis acidity can effectively suppress LiPS dissolution even at a high sulfur content of 80 parts by weight or more.

In an embodiment of the present disclosure, since it is well-known that the sulfur content is critical for the energy densities of Li—S batteries, it is essential to explore approaches that are effective for a sulfur cathode with a high sulfur content. 2D nanosheet morphologies may be well-aligned with this goal because their bifacial surfaces can provide plenty of adsorption sites for LiPS. For this reason, compared to 2D bulk layered, OD nanoparticle, and OD hollow structures, exfoliated 2D nanosheets can offer abundant binding sites with LiPS at a given material amount (FIG. 1A).

In an embodiment of the present disclosure, unlike the synthesis of many other nanostructures that relies on crystal growth from seeds, a soft-chemical exfoliation of the pristine layered titanium oxide yields highly anisotropic 2D titanium oxide nanosheets without depending on delicate crystal growth processes. Since the exfoliation process leads to the separation of the layered crystal lattice into individual monolayers, the resulting single crystalline nanosheets have well-ordered surface structures originating from the interlayer structures of the original bulk host. In other words, the surface structure of the exfoliated titanium oxide nanosheets can be tailored by altering the crystal structure of the original bulk counterpart. As depicted in FIG. 1B, two types of titanium oxide sheet structures are feasible: trititanate-type titanium oxide (TT) and lepidocrocite-type titanium oxide (LT). The TT nanosheet possesses a puckered layer structure composed of corner-shared $[Ti_3O_{14}]$ units with two kinds of oxygen sites, i.e. bridging and terminal oxygens. By contrast, the LT nanosheet has an unpuckered flat layer structure composed of an infinitely-extended, edge-shared $TiO_6$ octahedral array. The TT nanosheet tends to have Lewis basicity arising from the terminal oxygens with high electron density. In comparison, owing to the absence of basic terminal oxygens, the LT nanosheet exhibits Lewis acidity originating from the under-coordinated (i.e. penta-coordinated) Ti species. The distinct surface structure of the LT can result in enhancing the affinity with LiPS via Lewis acid-base interactions.

In the metal oxide nanosheet-sulfur nanocomposite according to an embodiment of the present disclosure, the Lewis acidity originating from under-coordinated Ti species as well as the large surface area associated with the 2D structure can endow 2D lepidocrocite metal oxide (e.g., titanium oxide) with the efficient interaction with LiPS. The lithium-sulfur battery containing the metal oxide nanosheet-sulfur nanocomposite can exhibit a high capacity retention even after 300 cycles, and the considerably improved cycling performance can provide useful insight for designing sulfur cathodes, that is, the incorporation of acidic 2D metal oxide nanosheets.

MODE FOR CARRYING OUT THE INVENTION

Hereinafter, examples of the present disclosure will be described in detail. However, the present disclosure may not be limited thereto.

Examples

1. Preparation Process and Characterization

<Synthesis of Exfoliated 2D Titanium Oxide Nanosheets>

The pristine LT ($Cs_{0.67}Ti_{1.83}\square_{0.17}O_4$) and TT ($Na_2Ti_3O_7$) materials were prepared by a conventional solid-state reaction with $Cs_2CO_3/K_2CO_3$ and $TiO_2$ precursors at 800° C. to 900° C. Their protonated derivatives ($H_{0.7}Ti_{1.83}\square_{0.17}O_4$ and $H_2Ti_3O_7$) were obtained by the reaction of the pristine materials with excess 1 M HCl aqueous solution at room temperature for 24 h. The exfoliation of LT was achieved by intercalation of tetrabutylammonium ions into the protonated LT derivative, yielding the aqueous colloidal suspension of LT nanosheets. Similarly, the exfoliated TT nanosheets were attained by the sequential intercalation of methylammonium and propylammonium into the protonated TT derivative. Prior to the loading of sulfur, the obtained colloidal suspensions of titanium oxide nanosheets were dialyzed with distilled water to completely remove excess tetrabutylammonium and propylammonium ions.

<Synthesis of Hollow $TiO_2$ Microspheres>

Hollow $TiO_2$ microsphere was prepared by solvothermal reaction of tetra-n-butyl titanium oxide, acetylacetone, and isopropyl alcohol at 200° C. for 8 h, as reported previously. The product was separated by centrifugation, washed with ethanol several times, and dried at 60° C. overnight.

<Synthesis of 2D Titanium Oxide Nanosheet-Sulfur Nanocomposites>

An aqueous solution of $Na_2S.9H_2O$ (Sigma-Aldrich) and $Na_2SO_3$ (Sigma-Aldrich) was added into the aqueous colloidal suspensions of LT or TT nanosheets under vigorous stirring. Then, aqueous 1 M HCl solution and PVP were simultaneously added dropwise into the resulting colloidal suspensions. Next, the solution baths were ultrasonicated for 0.5 h. The products were separated by centrifugation, washed with distilled water for several times, and vacuum-dried at 60° C. for 12 h. The obtained products were heated at 150° C. for 5 h under Ar flow. Two kinds of the LTS nanocomposites were prepared with the sulfur contents of 88 parts by weight and 80 parts by weight. Also, two kinds of sulfur contents of 90 parts by weight and 80 parts by weight were employed for the synthesis of TTS nanocomposites. The control HTS and ATS nanocomposites with the sulfur content of 80 parts by weight were prepared by the same synthetic procedure.

<Synthesis of $Li_2S_n$>

The reference $Li_2S_n$ was prepared by reacting elemental sulfur with 1 M THF solution of lithium triethylborohydride in a molar ratio of 2.75:1 in an Ar-filled glovebox. After the reaction, the precipitated yellow powder of $Li_2S_n$ was obtained by drying the resulting solution under vacuum. The obtained yellow product was washed with toluene and vacuum-dried.

<Synthesis of $LT-Li_2S_n$, $TT-Li_2S_n$, $HT-Li_2S_n$, and $AT-Li_2S_n$>

The LT and TT nanosheets were restored from the corresponding colloidal suspensions by freeze-drying and vacuum-drying at 150° C. for 12 h. 0.2 mmol of LT, TT, HT, and AT were mixed with 0.6 mmol of $Li_2S_n$ in THF (Sigma-Aldrich) in an Ar-filled glovebox. The obtained mixtures were stirred for 6 h. The products were separated by centrifugation and dried under vacuum overnight.

<Characterization>

The crystal structures of the nanocomposites were investigated by carrying out powder XRD analysis at room temperature using a Rigaku diffractometer with Ni-filtered Cu Kα radiation. The Rietveld refinement for the collected XRD patterns was performed using the GSAS program package. During the Rietveld refinement, the peak profiles were simulated using the pseudo-Voigt function and the background was defined with 16 term shifted Chebyschev function. The occupancy parameters of all the atoms were kept fixed at the nominal compositions. The scale factor, background, zero-angle shift, lattice parameters, and peak profiles were refined simultaneously in the initial refinements. The isotropic thermal parameters and positional coordinates were set as variables in the last step of refinements. The sulfur contents of the nanocomposites were determined by carrying out TG analysis using TA Instruments SDT Q600. TG curves were collected at a rate of 5° C./min$^{-1}$ under $N_2$ flow. The FE-SEM and TEM micrographs were attained using Jeol JSM-6700F and Jeol JEM-2100F electron microscopes, respectively. The EDS-elemental maps were recorded with an energy-dispersive X-ray spectrometer equipped in the FE-SEM machine. $NH_3$-TPD measurements were carried out using AutoChem II 2920 (Micrometrics). 40 mg of each sample was heated at 300° C. under He flow. $NH_3$ adsorption was processed after samples cooled down to 100° C. $NH_3$ desorption measurements were carried out by heating the samples to 800° C. with a heating rate of 10° C./min. Ti K-edge XANES spectra were collected at extended X-ray absorption fine structure (EXAFS) facility installed in the beamline 10C at the Pohang Accelerator Laboratory (PAL, Pohang, Korea). The XANES data were collected in transmission mode at room temperature. The energy was calibrated by simultaneously measuring the reference spectrum of $TiO_2$. The chemical interaction of LiPS with titanium oxides was investigated by carrying out K-alpha XPS analysis (Thermo Scientific Inc., U.K). All the measured XPS data were reproduced with Gaussian-Lorentzian functions and Shirley-type background with the help of the XPSPEAK software. The S 2p spectra were fit with spin-orbit doublets of S $2p_{3/2}$ and S $2p_{1/2}$ components with an energy gap of 1.18 eV and peak area ratio of 2:1 with identical full-width-at-half-maximum (FWHM).

<Electrochemical Measurements>

Electrochemical properties of titanium oxide-sulfur nanocomposites were evaluated by fabricating CR2032-type coin cells. For this, slurries were prepared by dispersing active materials, poly(vinylidene fluoride) (PVDF, MW=560,000, Aldrich) and Super P in N-methyl-2-pyrrolidone (NMP, Junsei Chemical) in a mass ratio of 75:15:10. Each slurry was then cast onto an aluminum foil current collector (20 μm, Hohsen, Japan) using the doctor blade technique, followed by a drying step in a convection oven at 60° C. overnight. The dried samples were punched into 12 pi circular discs. Each coin cell consists of a cathode, a Li metal foil counter electrode (as both counter and reference electrodes), and a polypropylene separator (Celgard 2,400). For the electrolyte, 1 M lithium bis(trifluoromethane)sulfonamide (LiTFSI, Aldrich) and 2 parts by weight of lithium nitrate ($LiNO_3$, Aldrich) were thoroughly dissolved in a solvent mixture of tetraethylene glycol dimethyl ether (TEGDME, Aldrich) and 1,3-dioxolane (DIOX, Aldrich) (0.33:0.67 in a volume ratio). All the processes were conducted inside an Ar-filled glovebox. The WBCS 3,000 (Wonatech, Korea) battery cycler was used for testing of the fabricated cells under the galvanostatic discharge-charge mode in the potential range of 1.7-2.7 V vs. Li/Li$^+$. The sulfur loading in the employed sulfur cathodes was 0.8 mg cm$^{-2}$. All of the specific capacities and C-rates were calculated based on the mass of sulfur only. The C-rate in the precycling was 0.05 C (1 C=1,000 mA g$^{-1}$), and was increased to 1 C in the subsequent cycles. The electrodes for ex-situ XPS analysis were discharged at C/20.

2. Analysis Results

<Structural and Morphological Analyses>

Figure 2A:
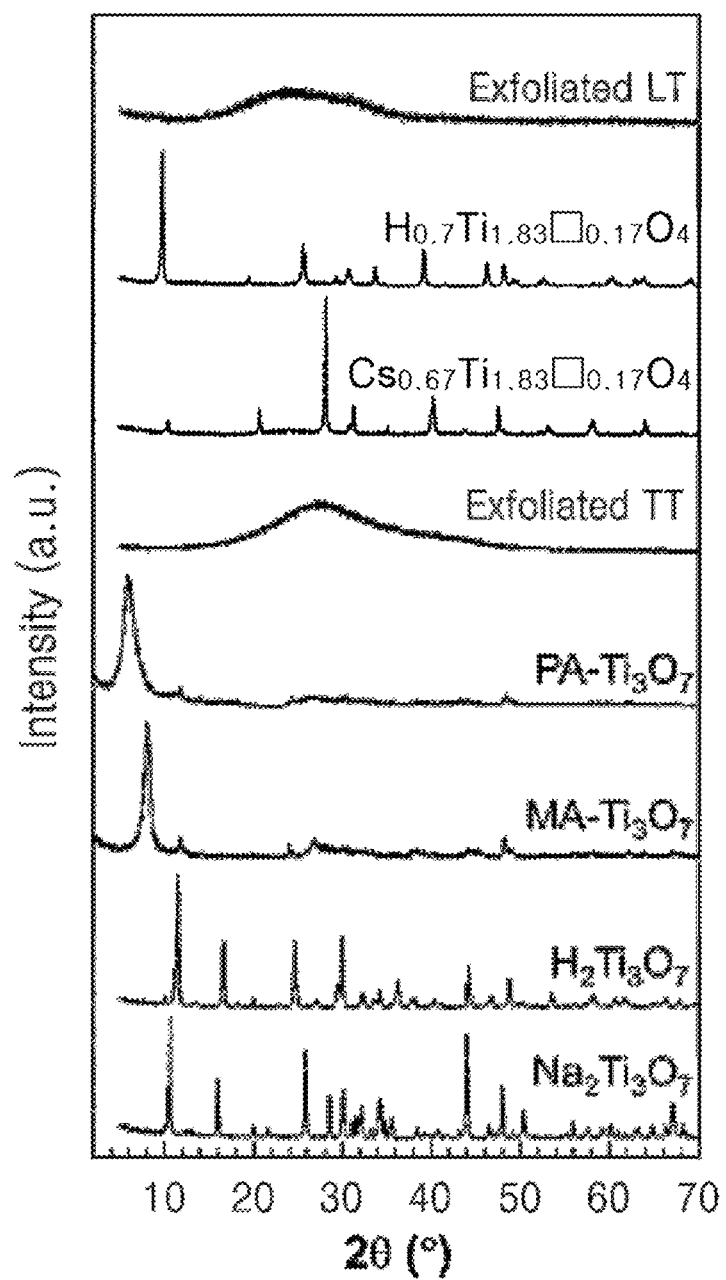
FIG. 2A shows powder XRD patterns of the pristine layered titanium oxides and their derivatives according to an example of the present disclosure.

The LT and TT nanosheets were both prepared by soft-chemical exfoliation reaction of the corresponding pristine layered titanium oxide materials using organic intercalant cations. The LT ($Cs_{0.67}Ti_{1.83}\square_{0.17}O_4$, where $\square$ is a vacancy) and TT ($Na_2Ti_3O_7$) structures were obtained by a heat-treatment of stoichiometric mixture of anatase $TiO_2$ and $Cs_2CO_3/Na_2CO_3$ at 800° C./900° C., as reported previously. As shown in the powder X-ray diffraction (XRD) patterns of FIG. 2A, the pristine $CS_{0.67}Ti_{1.83}\square_{0.17}O_4$ and $Na_2Ti_3O_7$ materials showed well-defined Bragg reflections of lepidocrocite titanium oxide phase under the space group Immm (JCPDS-84-1226) and trititanate phase under the space group P21/m (JCPDS-72-0148), respectively, verifying the formation of single-phase layered titanium oxides.

The protonated derivatives of $H_{0.7}Ti_{1.83}\square_{0.17}O_4$ and $H_2Ti_3O_7$ were prepared by the reaction of the aforementioned layered titanium oxides with 1 M HCl solution. The exfoliated LT nanosheets were prepared by the reaction of the protonated $H_{0.7}Ti_{1.83}\square_{0.17}O_4$ with aqueous tetrabutylammonium hydroxide (TBA.OH) solution. For the synthesis of TT nanosheets, the $H_2Ti_3O_7$ was first reacted with methylamine (MA) and then with propylammonium (PA) cations, leading to a gradual increase in interlayer distance from 0.8 nm to 1.5 nm. An ultrasonic treatment of PA-intercalated trititanate led to delamination into TT nanosheets. As presented in FIG. 2A, both the exfoliated LT and TT nanosheets did not show distinct Bragg reflections except a broad feature at 2θ=~15°-25° corresponding to the file of exfoliated nanosheets, confirming the complete exfoliation of the bulk layered titanium oxides into their individual nanosheets. Field emission-scanning electron microscopic (FE-SEM) and transmission electron microscopic (TEM) analyses clearly showed highly anisotropic 2D morphologies of both exfoliated LT and TT nanosheets. As shown in FIG. 3, colloids of the exfoliated LT and TT nanosheets were freeze dried and utilized for morphological analysis using FE-SEM. The FE-SEM micrographs clearly demonstrated nanosheet morphology of the LT and TT, and the exfoliated LT and TT nanosheets were drop casted on copper grid and used for TEM analysis. The TEM microgaphs of these materials revealed the presence of monolayers with lateral size of few hundred nanometers, which clearly showed highly anisotropic 2D morphologies of these two materials.

Figure 4:
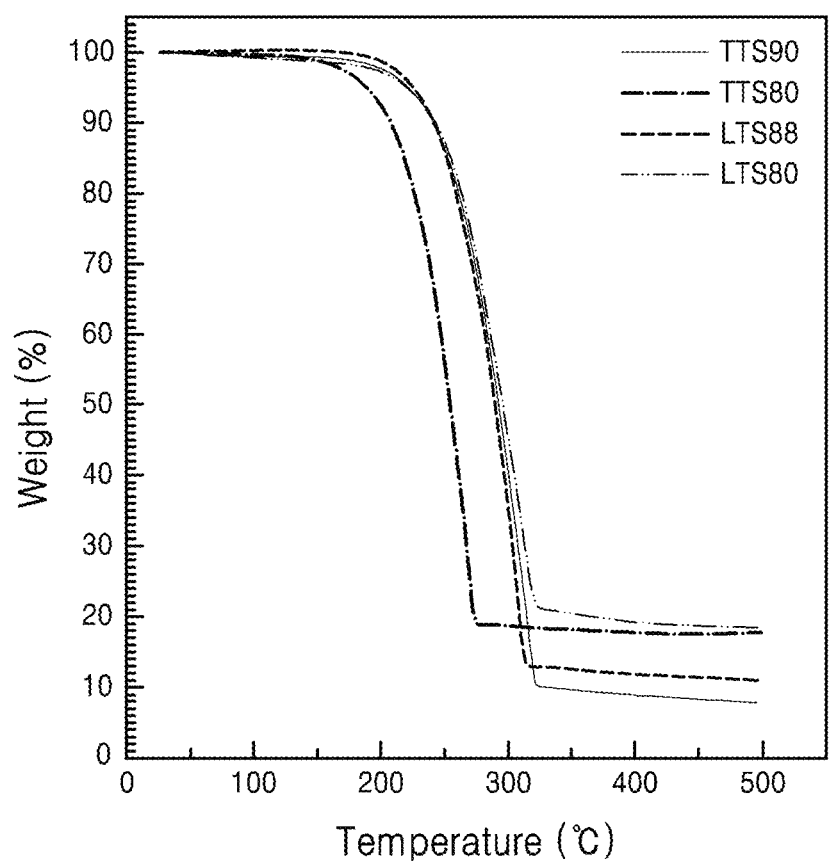
FIG. 4 shows thermogravimetric (TG) curves of the layered titanium oxide-sulfur nanocomposites according to an example of the present disclosure.
Figure 5A:
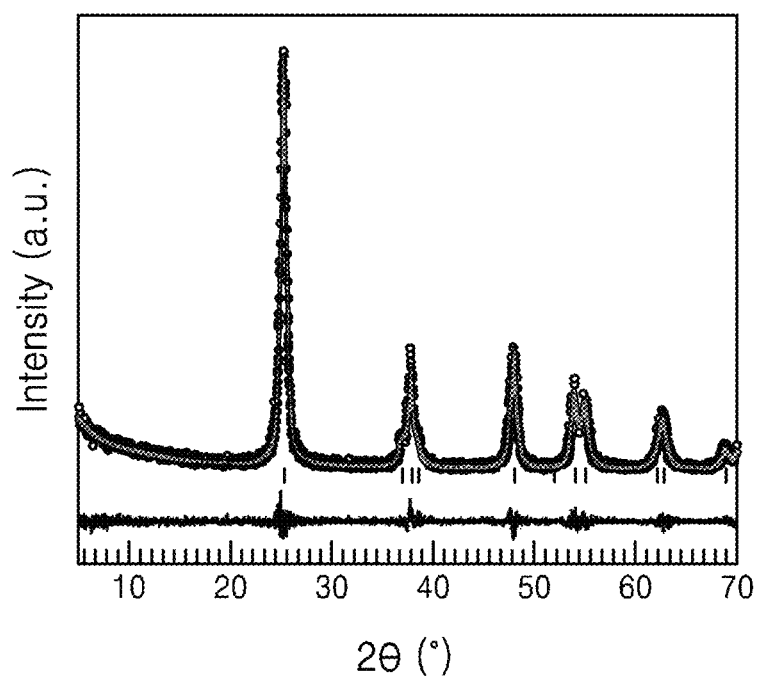
FIG. 5A shows a powder X-ray diffraction (XRD) pattern of the HT microspheres according to an example of the present disclosure: the empty circles (○) represent the observed, the upper line represents the fit obtained through Rietveld refinement, and the lower line represents difference between the observed data and the refinement; the vertical lines (|) represent the positions of Bragg reflections corresponding to the anatase phase of $TiO_2$ (space group: I41/amd).
Figure 5B:
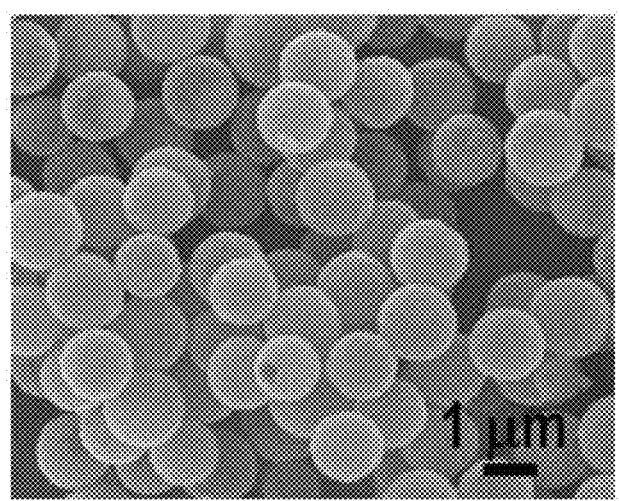
FIG. 5B shows FE-SEM images of the HT microspheres according to an example of the present disclosure.
Figure 5C:
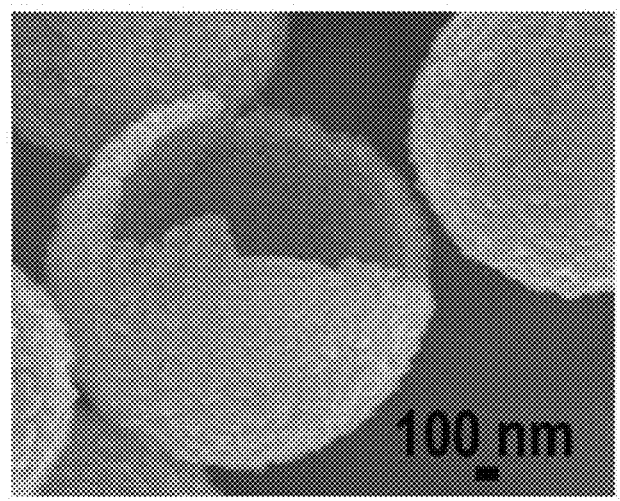
FIG. 5C shows FE-SEM images of the HT microspheres according to an example of the present disclosure.
Figure 5D:
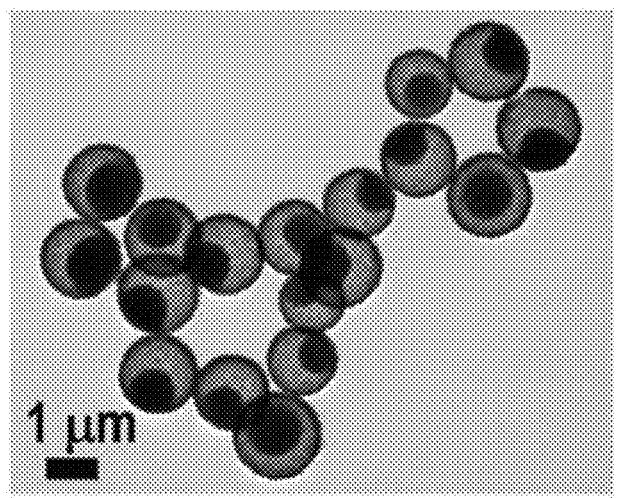
FIG. 5D shows TEM images of the HT microspheres according to an example of the present disclosure.
Figure 5E:
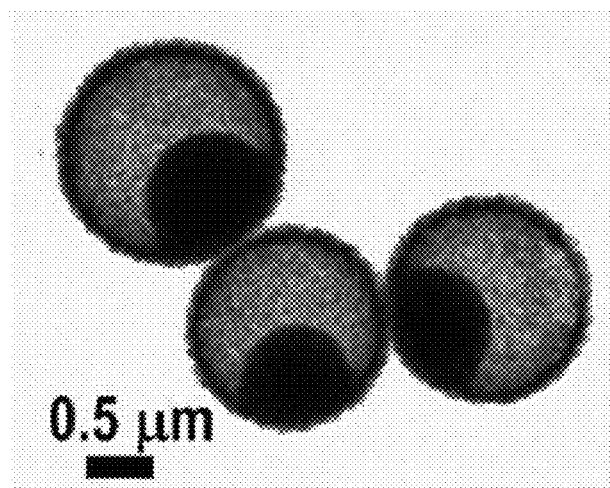
FIG. 5E shows TEM images of the HT microspheres according to an example of the present disclosure.
Figure 6:
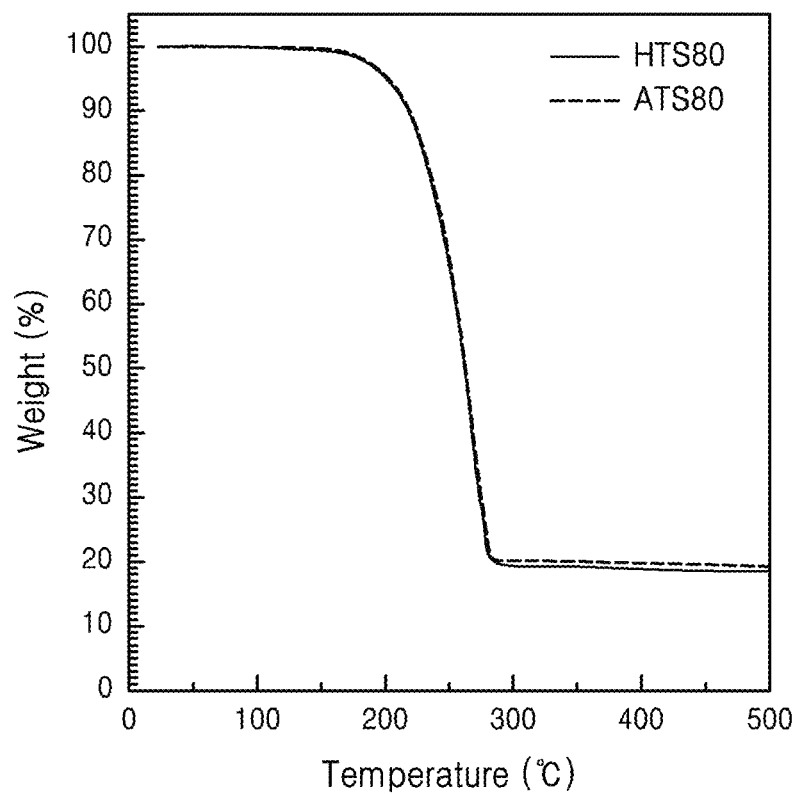
FIG. 6 shows TG curves of the control samples HTS80 and ATS80.

Two kinds of the titanium oxide-sulfur nanocomposites with different sulfur contents were prepared by direct growth of sulfur on the exfoliated LT or TT nanosheets for use as sulfur cathodes. To determine sulfur contents in these nanocomposites, TG analysis was carried out with ramp of 5° C./min under $N_2$ gas flow (20 mL/min) and presented in FIG. 4. As the titanium oxide nanosheets are stable in this temperature region, the observed weight loss is attributed to sulfur evaporation and is consistent with previous reports. According to thermogravimetric (TG) analysis, the amounts of sulfur loaded in the two LT-sulfur nanocomposites were 88 parts by weight and 80 parts by weight, respectively. The resulting nanocomposites are denoted as LTS88 and LTS80, respectively. Similarly, two kinds of the TT-sulfur nanocomposites contain 90 parts by weight and 80 parts by weight (denoted as TTS90 and TTS80, respectively). To evaluate the structural and morphological effect of the exfoliated 2D titanium oxide nanosheets, two control samples, hollow $TiO_2$ (HT) microspheres and commercial anatase $TiO_2$ (AT), were also prepared. As reported previously, the HT hollow microsphere synthesized by solvothermal reaction crystallizes with anatase $TiO_2$ phase and displays monodispersed microsphere morphology with uniform diameter of ~1.5 μm (FIG. 5). The sulfur nanocomposites based on these two control $TiO_2$ components (denoted as HTS80 and ATS80, respectively) were prepared with a sulfur content of 80 parts by weight and presented by carrying out TG analysis with ramp of 5° C./min under $N_2$ gas flow (20 mL/min) (FIG. 6).

Figure 2B:
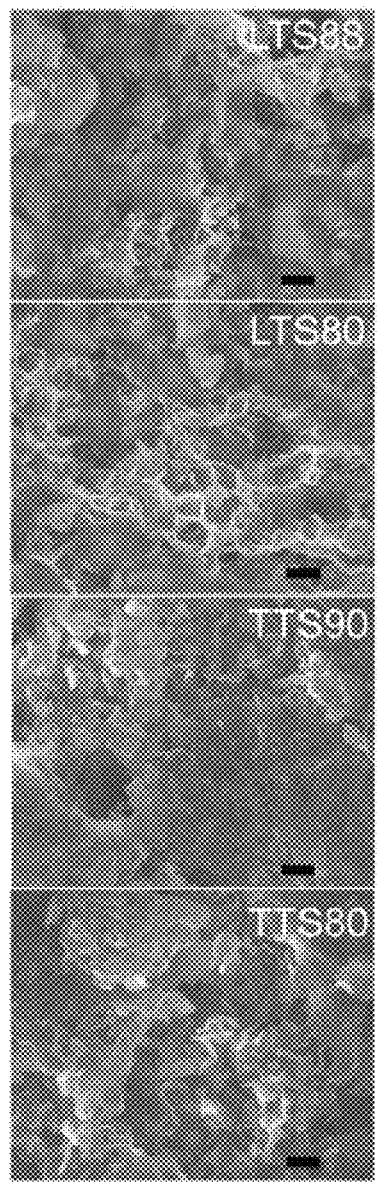
FIG. 2B(i) shows a FE-SEM micrograph of the titanium oxide-sulfur nanocomposites (scale bar: 1 μm) according to an example of the present disclosure.
Figure 2C:
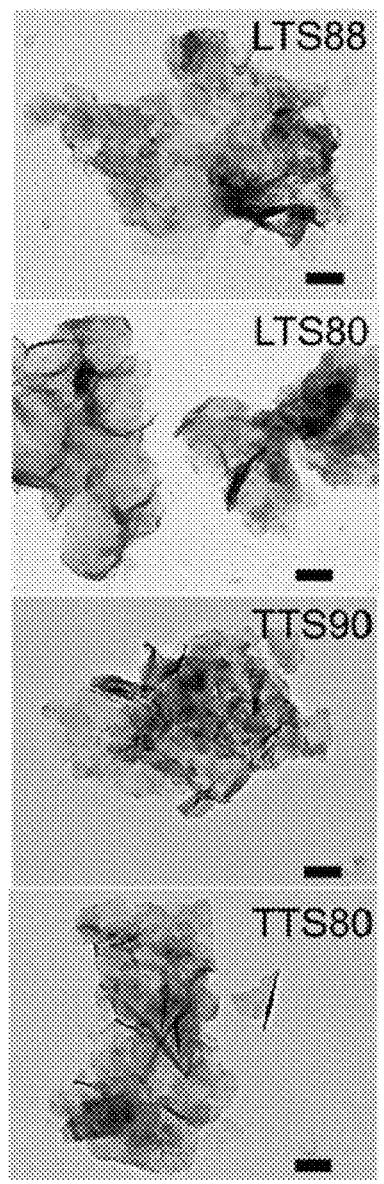
FIG. 2C(i) shows a TEM micrograph of the same nanocomposites (scale bar: 200 nm) according to an example of the present disclosure.
Figure 3A:
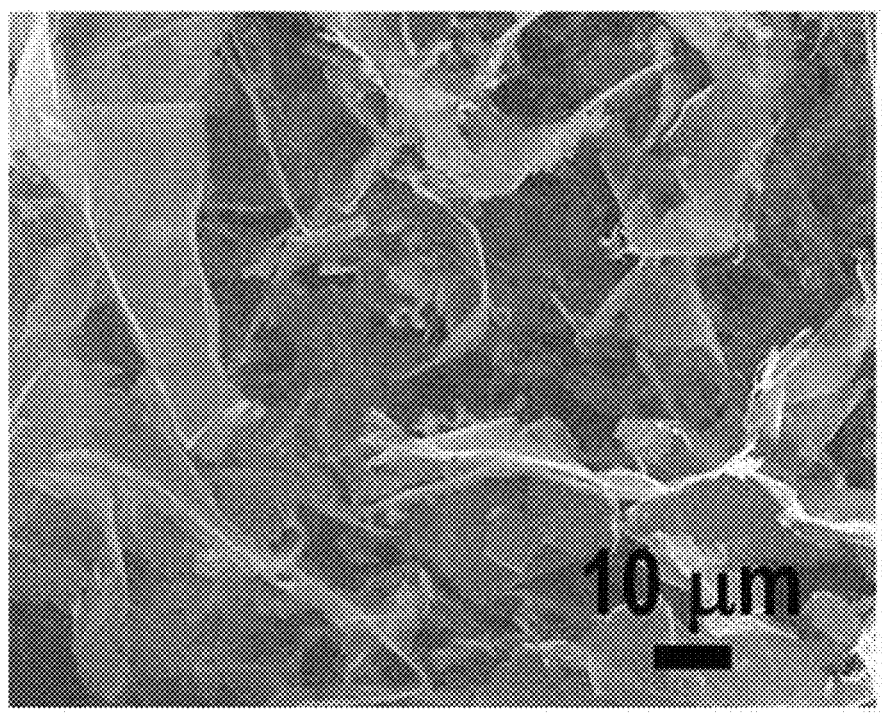
FIG. 3A is a field emission-scanning electron microscopic (FE-SEM) image of exfoliated LT nanosheet according to an example of the present disclosure.
Figure 3B:
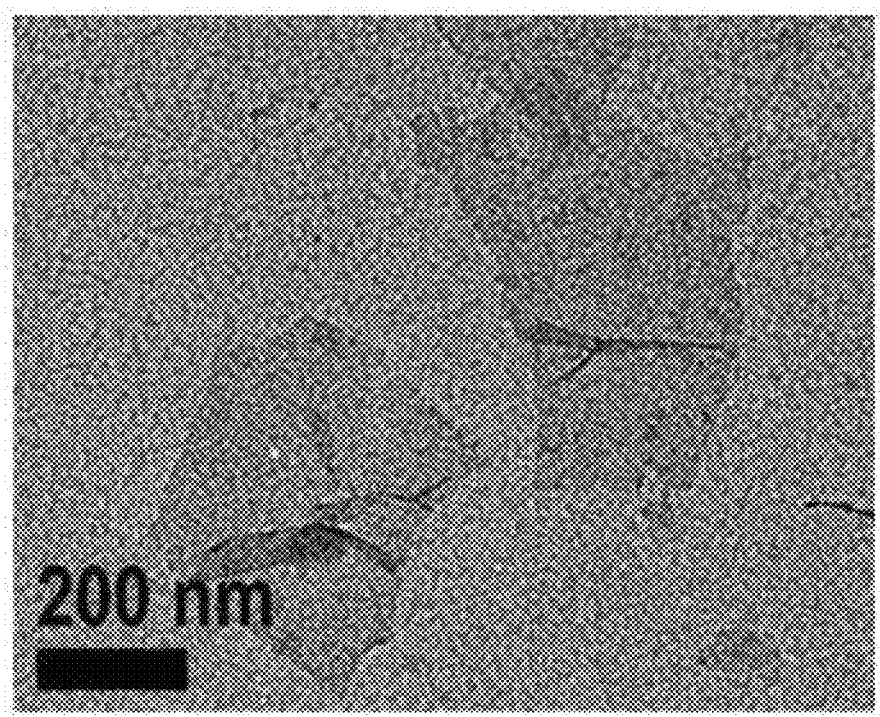
FIG. 3B is a transmission electron microscopic (TEM) image of exfoliated LT nanosheet according to an example of the present disclosure.
Figure 3C:
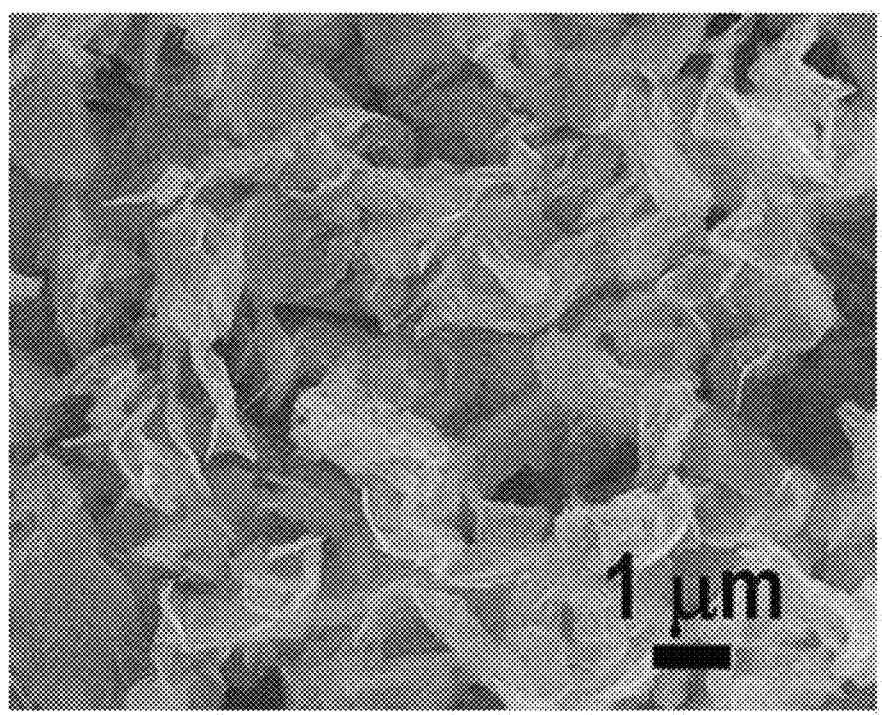
FIG. 3C is a field emission-scanning electron microscopic (FE-SEM) image of exfoliated TT nanosheet according to an example of the present disclosure.
Figure 3D:
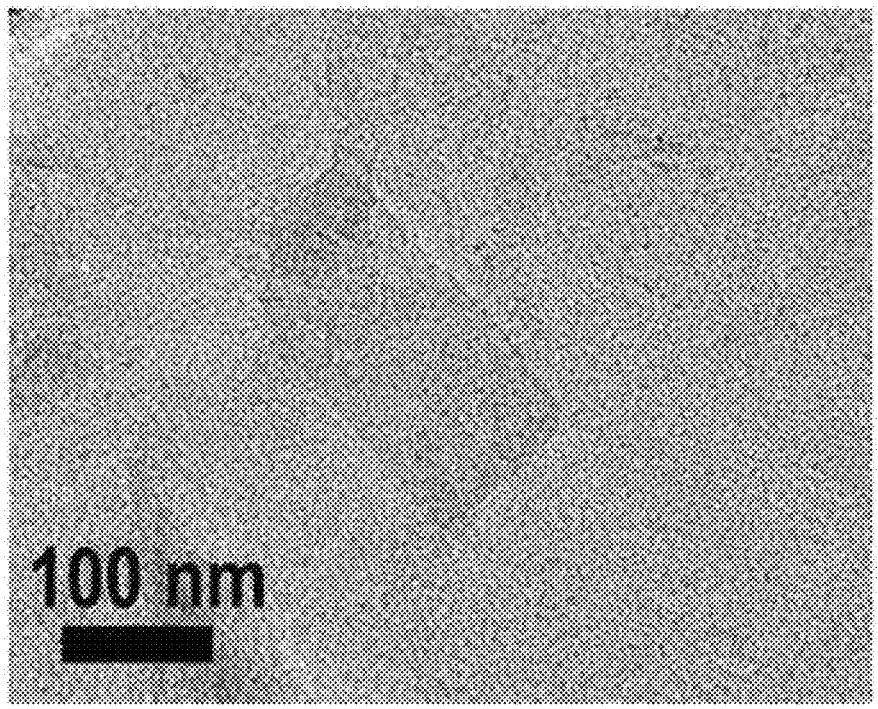
FIG. 3D is a transmission electron microscopic (TEM) image of exfoliated TT nanosheet according to an example of the present disclosure.
Figure 7:
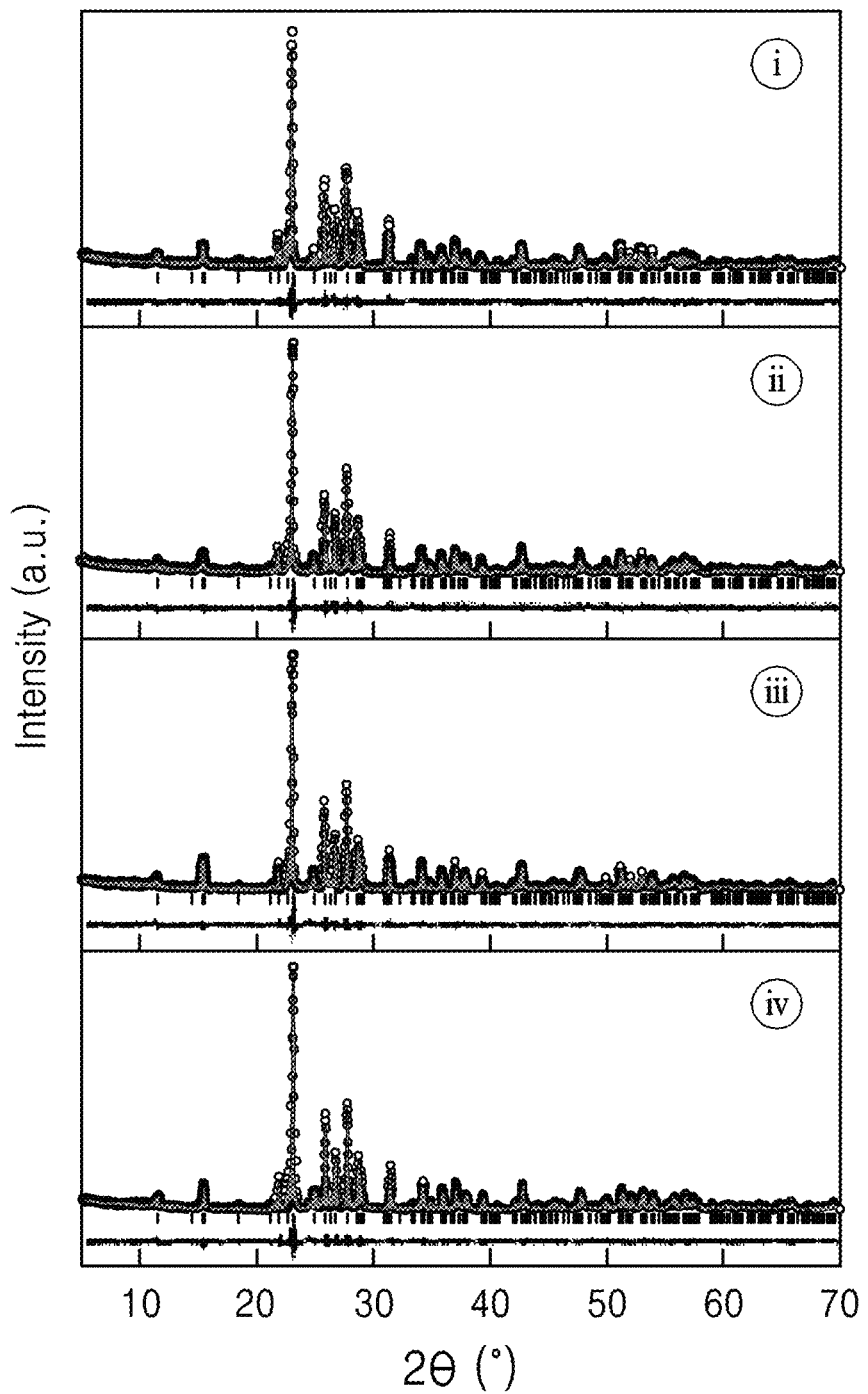
FIG. 7 shows powder XRD patterns of (a) LTS88, (b) LTS80, (c) TTS90, and (d) TTS80 nanocomposites according to an example of the present disclosure: the empty circles, upper lines, and lower lines represent the observed XRD and calculated XRD patterns, and the difference between them, respectively, and the vertical lines represent the positions of Bragg reflections corresponding to the orthorhombic phase of elemental sulfur (space group: Fddd).
Figure 8A:
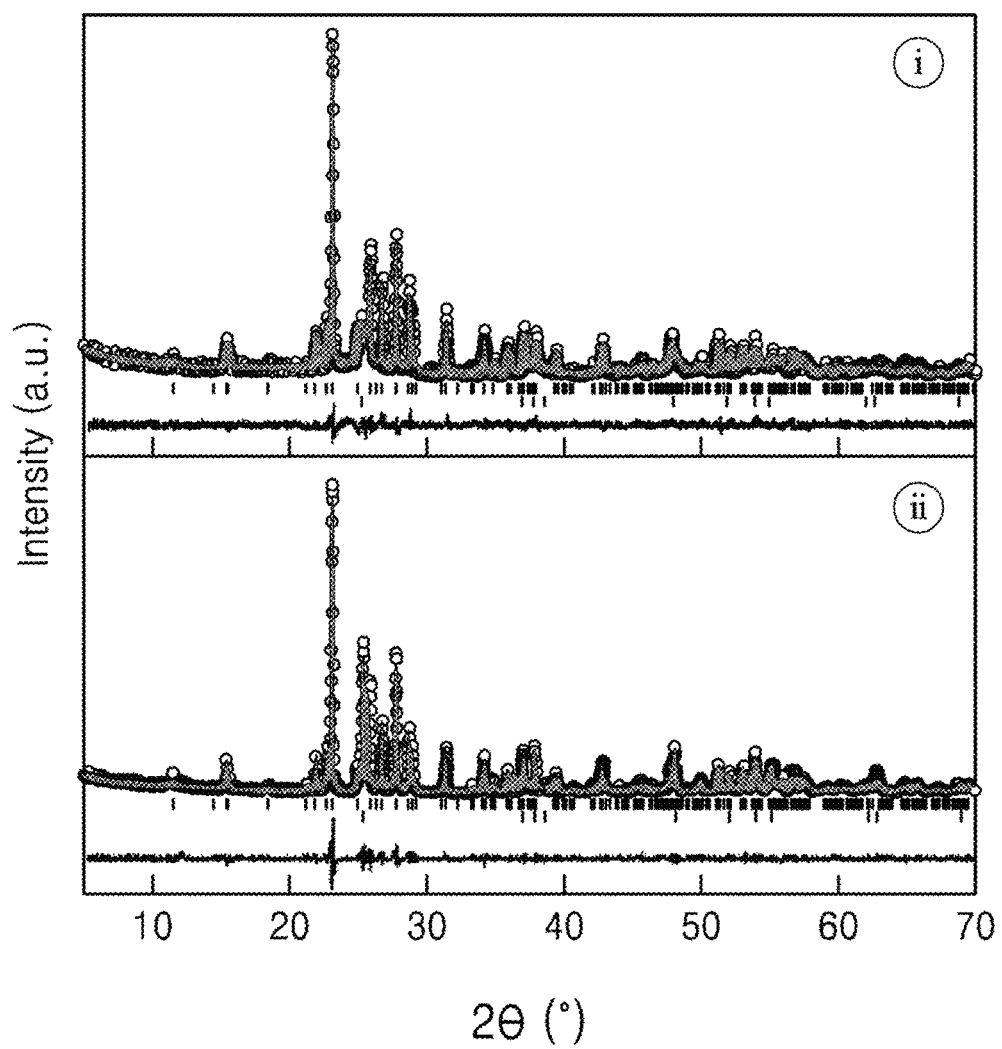
FIG. 8A shows powder XRD patterns of (i) HTS80 and (ii) ATS80 according to an example of the present disclosure: the empty circles (○) represent the observed, the upper line represents the fit obtained through Rietveld refinement, and the lower line represents difference between the observed data and the refinement; and the upper and lower vertical lines represent the positions of Bragg reflections corresponding to the orthorhombic phase of elemental sulfur (space group: Fddd) and the anatase phase of $TiO_2$ (space group: I41/amd), respectively.
Figure 8B:
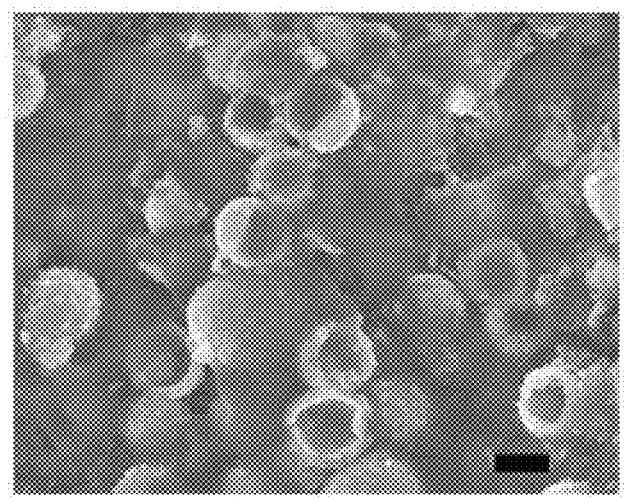
FIG. 8B shows FE-SEM micrographs of HTS80 (scale bar: 1 μm).
Figure 8C:
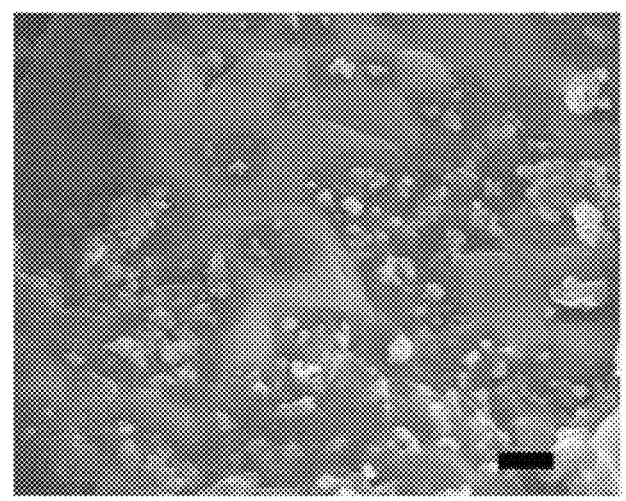
FIG. 8C shows FE-SEM micrographs of ATS80 (scale bar: 1 μm).

According to powder XRD analysis (FIG. 7) and resulting Rietveld refinement (Table 1), all the titanium oxide-sulfur nanocomposites of the present Example consist mainly of elemental sulfur (JCPDS-89-2600). The XRD patterns of the LTS and TTS nanocomposites are absent of the peaks corresponding to the layered titanium oxide, reflecting homogeneous dispersion of exfoliated titanium oxide nanosheets in those nanocomposites without phase segregation. In contrast, as shown in FIG. 8A to FIG. 8C, referring to powder XRD and FE-SEM analysis results of the control HTS80 and ATS80, the control HTS80 and ATS80 with hollow microsphere and nanoparticle morphologies, respectively, demonstrate sharp reflections corresponding to the anatase phase of $TiO_2$, which is in consistent with previously reported nanocomposites, and $TiO_2$ hollow microspheres and nanoparticles can clearly be seen from the FE-SEM images of the control HTS80 and ATS80, respectively, which confirms phase segregation between titanium oxide host and sulfur. This observation underscores the unique advantage of 2D nanosheet morphology in producing homogeneous nanocomposites involving elemental sulfur, which is attributed to their 2D morphologies and highly reactive surface characteristics. The homogeneous distributions of sulfur and nanosheets in all LTS and TTS nanocomposites were reflected in their FE-SEM images (FIG. 2B) in which 2D lamella morphologies are invisible. By contrast, the control samples HTS80 and ATS88 showed aggregated titanium oxide components, due to their relatively inhomogeneous mixing with elemental sulfur (FIG. 8B and FIG. 8C). The TEM (FIG. 2C) reconfirmed the homogenous dispersions of the 2D titanium oxide nanosheets in these nanocomposites.

TABLE 1

|  |  | LTS88 | LTS80 | TTS90 | TTS80 | HTS80 | ATS80 |
|---|---|---|---|---|---|---|---|
| Sulfur | a (Å) | 10.4677 | 10.4810 | 10.4791 | 10.4820 | 10.4785 | 10.4814 |
|  | b (Å) | 12.8726 | 12.8894 | 12.8861 | 12.8895 | 12.8847 | 12.8899 |
|  | c (Å) | 24.4864 | 24.5160 | 24.5141 | 24.5208 | 24.5082 | 24.5184 |
|  | V (Å$^3$) | 3299.45 | 3311.94 | 3310.24 | 3312.95 | 3308.89 | 3312.54 |
|  | ρ (g/cm$^3$) | 2.059 | 2.056 | 2.035 | 2.077 | 2.077 | 2.260 |
| $TiO_2$ | a (Å) |  |  |  |  | 3.7953 | 3.7834 |
|  | b (Å) |  |  |  |  | 3.7953 | 3.7834 |
|  | c (Å) |  |  | — |  | 9.5200 | 9.5088 |
|  | V (Å$^3$) | — |  | — | — | 137.13 | 136.11 |
|  | ρ (g/cm$^3$) |  |  |  |  | 3.654 | 3.899 |
|  | $R_{wp}$ (%) | 13.72 | 14.03 | 12.24 | 11.93 | 12.93 | 13.12 |
|  | $R_{exp}$ (%) | 7.90 | 7.97 | 6.82 | 6.70 | 10.97 | 7.32 |
|  | $\chi^2$ | 3.02 | 3.10 | 3.22 | 3.17 | 1.39 | 3.21 |
|  | $R_p$ (%) | 10.61 | 10.68 | 9.21 | 8.96 | 9.86 | 9.97 |
|  | $R_F$ (%) | 8.9 | 9.41 | 6.16 | 6.83 | 7.26 | 5.00 |

<FT-IR, $NH_3$-TPD, and XANES Analyses>

Figure 9A:
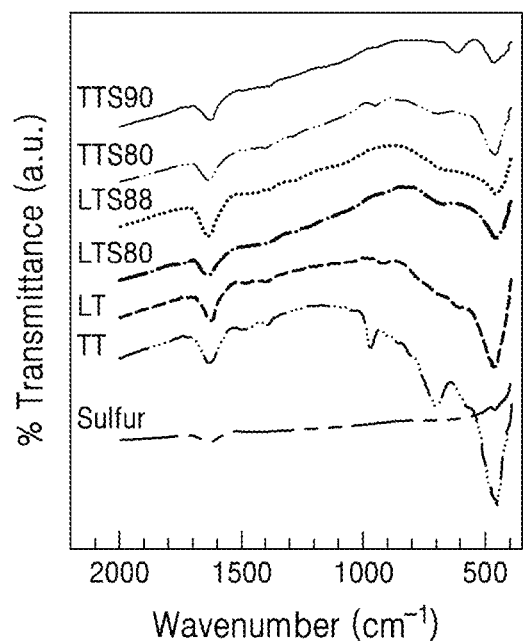
FIG. 9A shows FT-IR spectra of titanium oxide nanosheets and their nanocomposites with sulfur according to an example of the present disclosure.
Figure 9B:
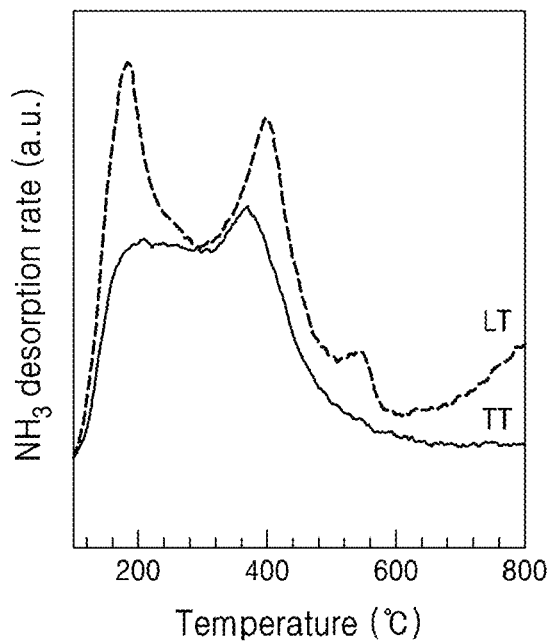
FIG. 9B shows profiles of $NH_3$-TPD of titanium oxide nanosheets and their nanocomposites with sulfur according to an example of the present disclosure.

The chemical bonding of the LT and TT nanosheets and their titanium oxide-sulfur nanocomposites was examined using Fourier transformed-infrared (FT-IR) spectroscopy. As presented in FIG. 9A, both the LT and TT nanosheets commonly showed IR bands at 455, 702, and 918 cm$^{-1}$ corresponding to the bending and stretching modes of Ti—O bond and a separate band at 1630 cm$^{-1}$ related to the bending vibration of adsorbed water molecules. Unlike the LT nanosheet, the TT nanosheet solely exhibited an additional distinct band at 970 cm$^{-1}$, which is assigned to the bending mode of hydroxyl group. Since the terminal oxygen tends to hold a greater electron density and shows higher Lewis basicity than the bridging oxygen, the TT nanosheets with terminal oxygens possess hydroxyl groups on their surfaces via the protonation of the terminal oxygens. In contrast, this hydroxyl group-related peak was not observed for the LT nanosheets with no terminal oxygens, reflecting relatively higher Lewis acidity. The IR result of the present Example clearly demonstrates that, in comparison with the TT nanosheets, the LT counterparts hold higher Lewis acidity originating from their structural configuration, which is advantageous in enhancing chemical interactions with basic LiPS species. After the composite formation with sulfur, the IR band related to Ti—O vibration remained intact, confirming the maintained integrity of the titanium oxide nanosheets. While a weak band at 462 cm$^{-1}$ corresponding to the stretching mode of the S—S bond was observed for elemental sulfur, this peak was concealed by the strong band of Ti—O bending vibration for all the nanocomposites of the present Example. In comparison with the TT nanosheets, both the TTS nanocomposites displayed much weakened peaks at 970 cm$^{-1}$ corresponding to the hydroxyl groups, reflecting the bond formation between the terminal oxygens and sulfur. Higher surface acidity of the LT nanosheets was further confirmed by NH$_3$-temperature programmed desorption (TPD) analysis (FIG. 9B). In contrast to the TT nanosheets, the LT showed a significantly higher amount of desorbed NH$_3$ in the temperature range of from 100° C. to 250° C. and from 380° C. to 800° C. These two different temperature regimes correspond to relatively weak and strong acid sites present on the surface of titanate nanosheet. The higher surface acidity of LT nanosheet than TT nanosheet originates both from the presence of penta-coordinated Ti species and the absence of basic terminal oxygens in the LT lattice.

Figure 9C:
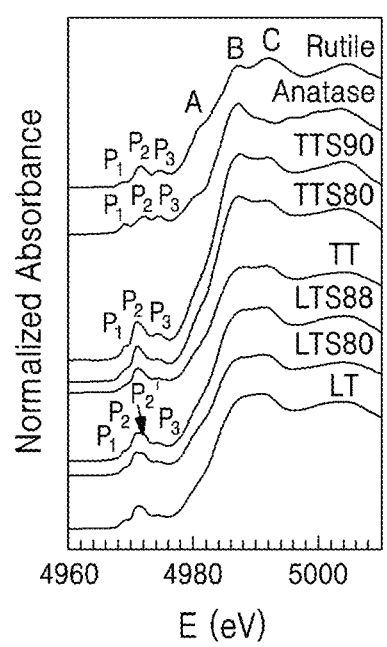
FIG. 9C shows Ti K-edge XANES spectra of titanium oxide nanosheets and their nanocomposites with sulfur according to an example of the present disclosure.

The electronic and local crystal structures of the LT and TT nanosheets before and after the composite formation with sulfur were investigated by Ti K-edge X-ray absorption near-edge structure (XANES) analysis. As plotted in FIG. 9C, all the materials showed pre-edge peaks $P_1$, $P_2$, $P_2'$, and $P_3$ corresponding to dipole-forbidden 1s→3d transitions and main-edge features A, B, and C related to the dipole-allowed 1s→3d transitions. The spectral features and energies of the pre-edge peaks provide information on the local atomic environment of the Ti ion. In comparison with anatase and rutile TiO$_2$, the TT and LT nanosheets showed a strong peak at $P_2$, indicative of the layered structures of these materials. In contrast to the TT, the LT displayed a distinct shoulder peak $P_2'$, indicating the presence of penta-coordinated Ti ions. The unsaturated coordination of this Ti imbues the LT nanosheets with Lewis acidity. As can be seen from FIG. 9C, the composite formation of the LT with sulfur did not give rise to any significant change in the XANES spectrum compared to that of the LT nanosheet, indicating the negligible influence of elemental sulfur on the local structure of the titanium oxide nanosheets. Similarly, the overall spectral feature of the TT nanosheet remained unchanged after the composite formation with sulfur.

<Polysulfide Adsorption Study>

Figure 10A:
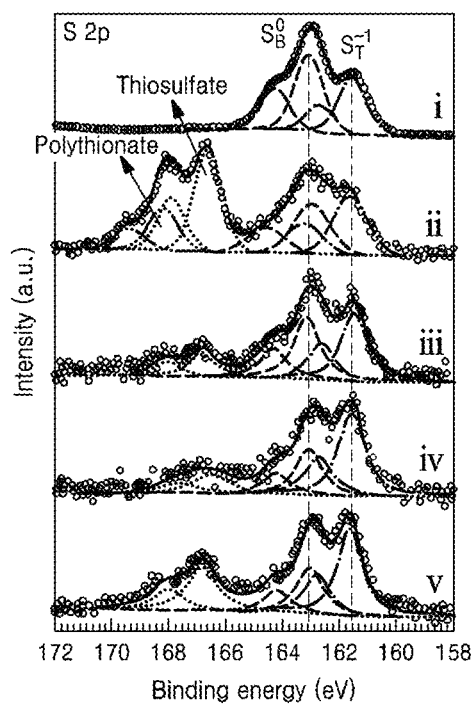
FIG. 10A shows S 2p XPS spectra of (i) $Li_2S_n$, (ii) LT-$Li_2S_n$, (iii) TT-$Li_2S_n$, (iv) HT-$Li_2S_n$, and (v) AT-$Li_2S_n$ according to an example of the present disclosure.

Since LiPS is mainly involved in the reaction of Li—S batteries, the interfacial interaction between titanium oxide nanosheets and LiPS was examined by carrying out X-ray photoelectron spectroscopy (XPS) analysis. In this experiment, the LT and TT nanosheets were reacted with Li$_2$S$_n$ and are denoted as LT-Li$_2$S$_n$ and TT-Li$_2$S$_n$. The as-made Li$_2$S$_n$ species showed two strong peaks at 161.6 eV and 163.1 eV in S 2p branch, assigned as the terminal ($S_T^{-1}$) and bridging) ($S_B^0$) sulfur atoms, respectively (FIG. 10A). The deconvolution of these peaks indicates that the Li$_2$S$_n$ species of the present Example contain more bridging sulfur atoms than terminal ones. The area ratio of $S_T^{-1}$ to $S_B^0$ is approximately 1:1.4, suggesting that the prepared LiPS is in the higher order forms (8≥n≥4), i.e., Li$_2$S$_5$. After the interaction of Li$_2$S$_n$ with LT, the area ratio of $S_T^{-1}$ to $S_B^0$ changed significantly from 1:1.4 to 1.3:1, suggesting the high order-to-low order (1<n<4) conversion of LiPS. In addition to the $S_T^{-1}$ and $S_B^0$, two more sulfur species were revealed in S 2p XPS spectrum of the LT-Li$_2$S$_n$ at 166.9 and 168.4 eV, which are attributed to thiosulfate and polythionate complexes, respectively. The thiosulfates ([S$_2$O$_3$]$^{2-}$) are formed by the redox reaction of Li$_2$S$_n$ with LT, and the increased area of $S_T^{-1}$ is associated with thiosulfate groups. The initially-formed thiosulphates react with higher order LiPS (i.e. Li$_2$S$_5$), resulting in the formation of polythionate complexes (([O$_6$S$_4$(S)$_{x-y}$]$^{2-}$; 8≥x≥4, y<3, x and y are chain lengths of LiPS) and lower order LiPS. The formation of thiosulfate and polythionate complexes indicates the strong interaction between LiPS and titanium oxide nanosheets through acid-base interaction. By contrast, the TT-Li$_2$S$_n$ showed weak contribution of thiosulphate groups to S 2p spectrum and absence of polythionate complexes, pointing to a weak interaction between the Li$_2$S$_n$ and TT nanosheets. It is anticipated that the weak interaction is associated with the low surface acidity. Similar results were observed for both the HT-Li$_2$S$_n$ and AT-Li$_2$S$_n$, suggesting the negligible interaction with Li$_2$S$_n$ species.

Figure 10B:
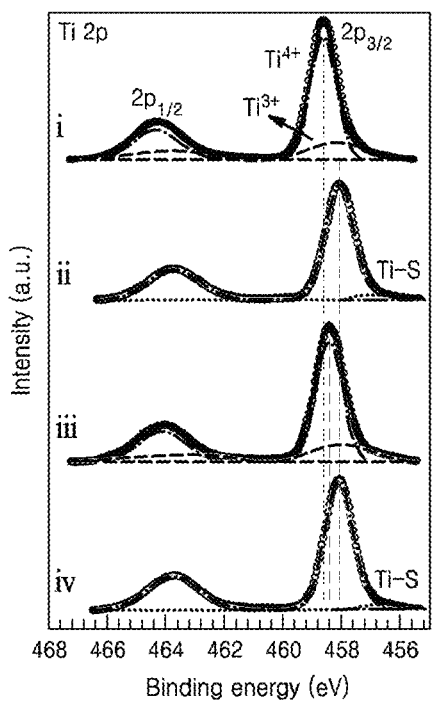
FIG. 10B shows Ti 2p XPS spectra of (i) LT nanosheet, (ii) LT-$Li_2S_n$, (iii) TT nanosheet, and (v) TT-$Li_2S_n$ according to an example of the present disclosure.
Figure 11:
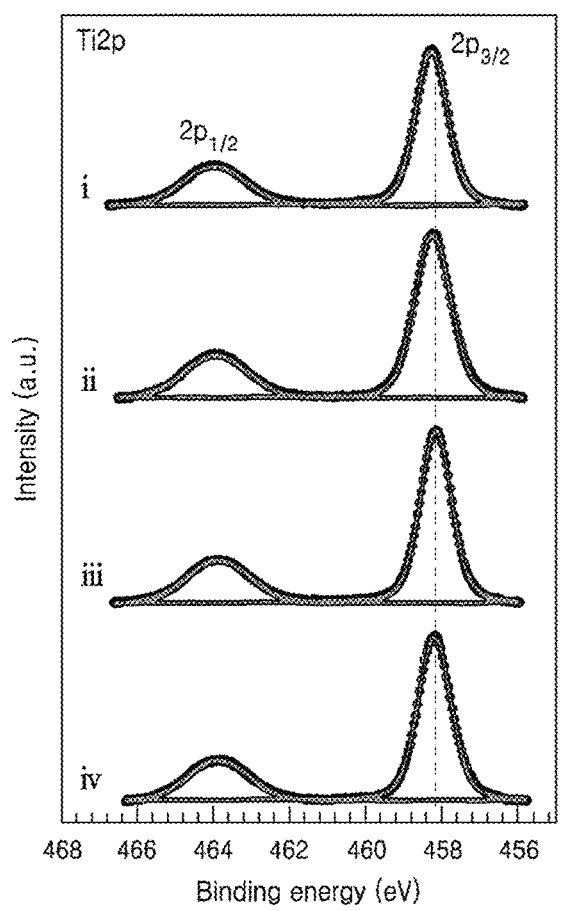
FIG. 11 shows Ti 2p X-ray photoelectron spectra (XPS) of (i) HT, (ii) HT-$Li_2S_n$, (iii) AT, and (iv) AT-$Li_2S_n$ according to an example of the present disclosure.

The XPS spectra in Ti 2p branch (FIG. 10B) form a consistent picture with those in S 2p branch. The LT nanosheets showed a higher binding energy at 458.6 eV than those of the TT and AT counterparts at 458.4 and 458.1 eV, respectively (FIG. 11), owing to the higher surface acidity of the LT nanosheets. Upon the interaction with Li$_2$S$_n$, the peak of the LT in the Ti 2p$_{3/2}$ was red-shifted by 0.6 eV, due to an electron transfer from sulfur species to the Ti in the LT. Meanwhile, the TT nanosheets displayed a lower binding energy at 458.4 eV arising from its lower surface acidity, resulting in a smaller red-shift of 0.4 eV for the TT-Li$_2$S$_n$. An additional adsorption test of Li$_2$S$_n$ with the HT and AT control samples did not show any peak-shift in their Ti 2p$_{3/2}$ spectra (FIG. 11), confirming the negligible interaction of the HT and AT with Li$_2$S$_n$. Two kinds of interactions (chemisorption and physisorption) of LiPS with the exfoliated 2D LT and TT nanosheets are possible. Possessing high surface acidity and penta-coordinated Ti species, the LT nanosheets show both physisorption and chemisorption of LiPS on the surface. Chemisorption of LiPS involves conversion of higher order LiPS into the polythionates, which occurs at the penta-coordinated Ti sites. On the contrary, the TT nanosheets demonstrate only physisorption of LiPS. Moreover, physisorption of LiPS is less likely at each corner-shared Ti sites with terminal oxygens owing to its high Lewis basicity.

<Li—S Battery Performance>

Figure 12A:
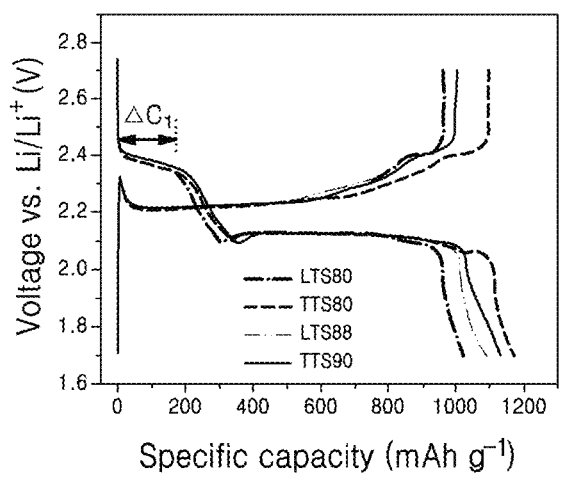
FIG. 12A shows electrochemical performance of various titanium oxide-sulfur nanocomposites: the first discharge-charge profiles of LTS and TTS with different sulfur loadings according to an example of the present disclosure.
Figure 12B:
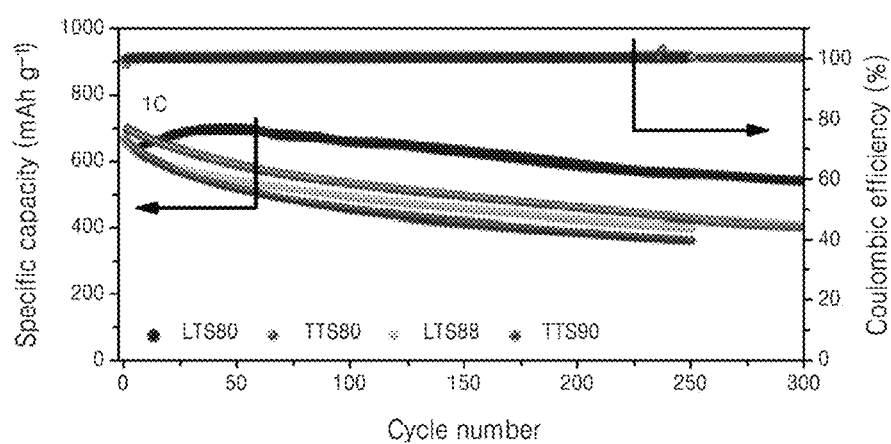
FIG. 12B shows electrochemical performance of various titanium oxide-sulfur nanocomposites: cycling performance and CE of LTS and TTS with different sulfur loadings according to an example of the present disclosure.

The impact of titanium oxide components on the electrochemical performance was evaluated by carrying out galvanostatic measurements of the corresponding Li—S cells. In this experiment, the LTS and TTS with different sulfur loadings were first tested (FIG. 12A and FIG. 12B). All of the specific capacities hereafter were calculated based on the mass of sulfur only. When measured at 0.05 C (1 C=1,000 mA g$^{-1}$), LTS80, TTS80, LTS88, and TTS90 exhibited reversible capacities of 1023.5, 1172.3, 1094.1, and 1135.2 mAh g$^{-1}$, respectively, in their first cycles. The initial Coulombic efficiencies (ICEs, defined as charging capacities/discharging capacities) of these samples were 94.3%, 93.7%, 91.7%, and 88.9%, respectively. The higher ICEs of the nanocomposites with 80 parts by weight sulfur than those with 88 parts by weight and 90 parts by weight indicate that 80 parts by weight is a critical point above which the titanium oxides become less effective in suppressing LiPS dissolution. These capacity values reveal that at the given sulfur contents, the TTS delivers higher discharge capacities than those of the LTS. For example, at the sulfur content of 80 parts by weight, TTS80 and LTS80 showed discharge capacities of 1,172.3 mAh g$^{-1}$ and 1,023.5 mAh g$^{-1}$, respectively, which might be attributed to the fact that in the case of LTS80, upon LiPS generation from the beginning of discharge, a certain portion of sulfur is spent for the formation of thiosulfate and polythionates so that a relatively less amount of sulfur participates in the lithiation toward Li$_2$S even though the same 80 parts by weight of sulfur was introduced for the synthesis of the titanium oxide-sulfur nanocomposite. This interpretation is indeed supported by the distinct discharge capacities during the upper plateau ($\Delta$C1 in FIG. 12A); the $\Delta$C1 values of LTS80 and TTS80 were 143.1 mAh g$^{-1}$ and 154.5 mAh g$^{-1}$, respectively. The larger portion of sulfur involvement in the formation of thiosulfate and polythionates is consistent with the peak intensities of the XPS spectra in FIG. 10A.

These titanium oxide-sulfur nanocomposites showed distinct cycling performance (FIG. 12B). Notably, the LTS80 demonstrated better cyclability than that of the other three samples; while the LTS80 and the TTS80 retained 82.3% and 57.9% after 300 cycles, respectively, the LTS88 and the TTS90 preserved 61.5% and 54.6% after 250 cycles, respectively. These results indicate that at various sulfur contents, LT is clearly superior to TT in retaining the original capacity of the electrode. Once again, this phenomenon can be explained by the acidic reaction of the LT with the LiPS, as observed in the XPS data in FIG. 10A. However, as the sulfur loading increases, such an effect is weakened, implying that there might exist a critical point in sulfur content beyond which the scavenging of polysulfides by the acidic reaction with the LT begins to be less effective, as demonstrated with the comparison of ICE values for varying sulfur contents.

Figure 12C:
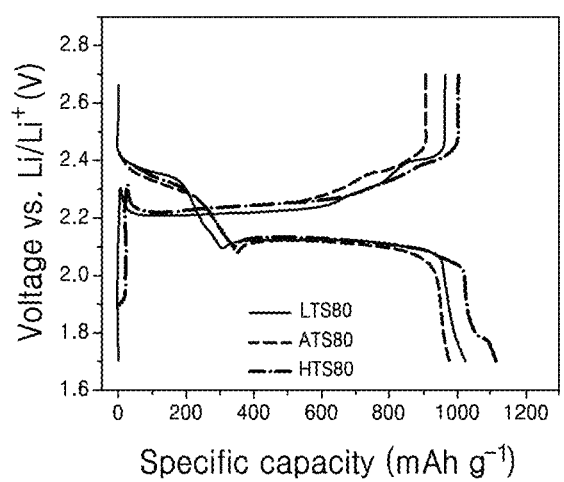
FIG. 12C shows electrochemical performance of various titanium oxide-sulfur nanocomposites: the first discharge-charge profiles of LTS80 and its derivatives based on control titanium oxide components.
Figure 12D:
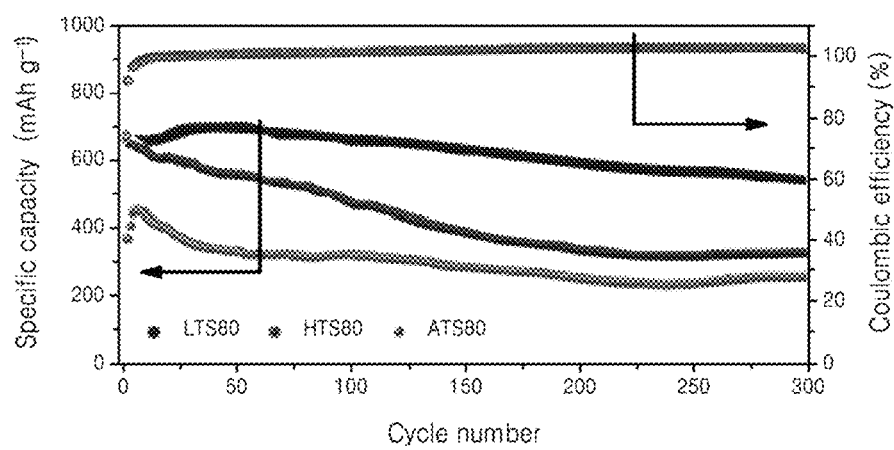
FIG. 12D shows electrochemical performance of various titanium oxide-sulfur nanocomposites: cycling performance of LTS80 and its derivatives based on control titanium oxide components.
Figure 13A:
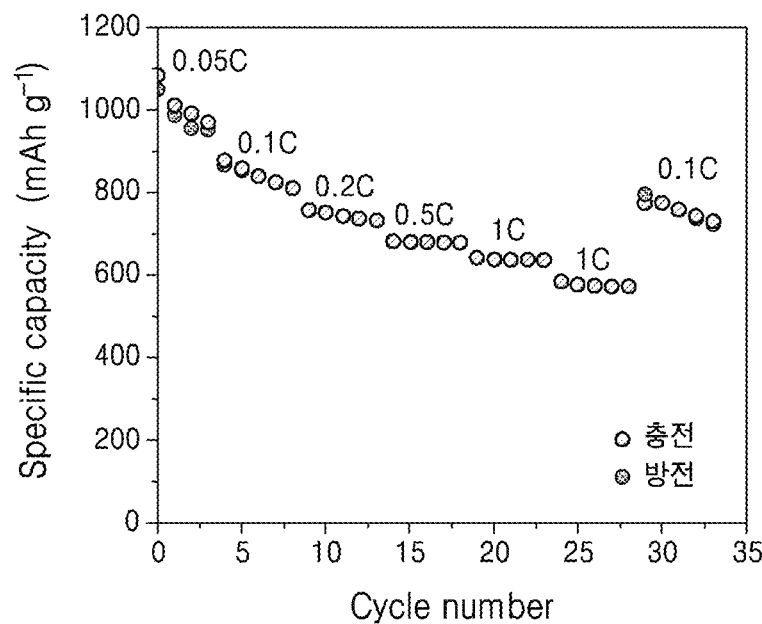
FIG. 13A shows rate performance of LTS80 according to an example of the present disclosure.
Figure 13B:
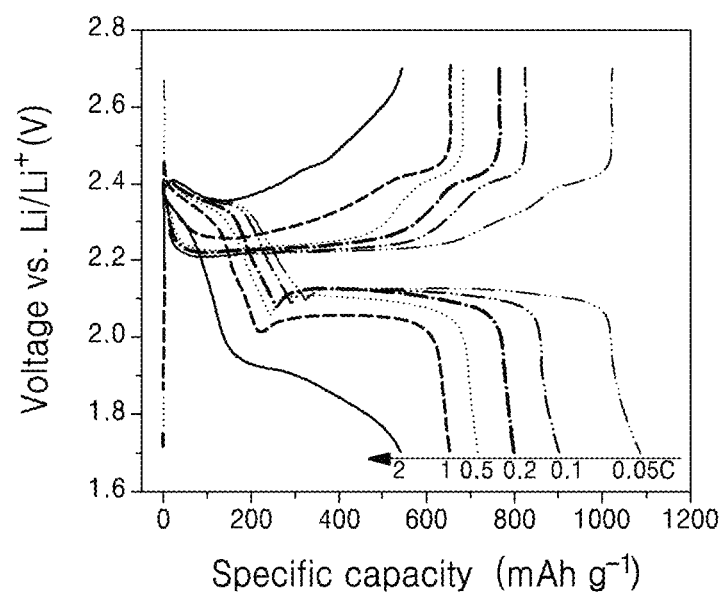
FIG. 13B shows charge-discharge profiles (1 C=1,000 mA g$^{-1}$) corresponding to FIG. 13A.
Figure 14:
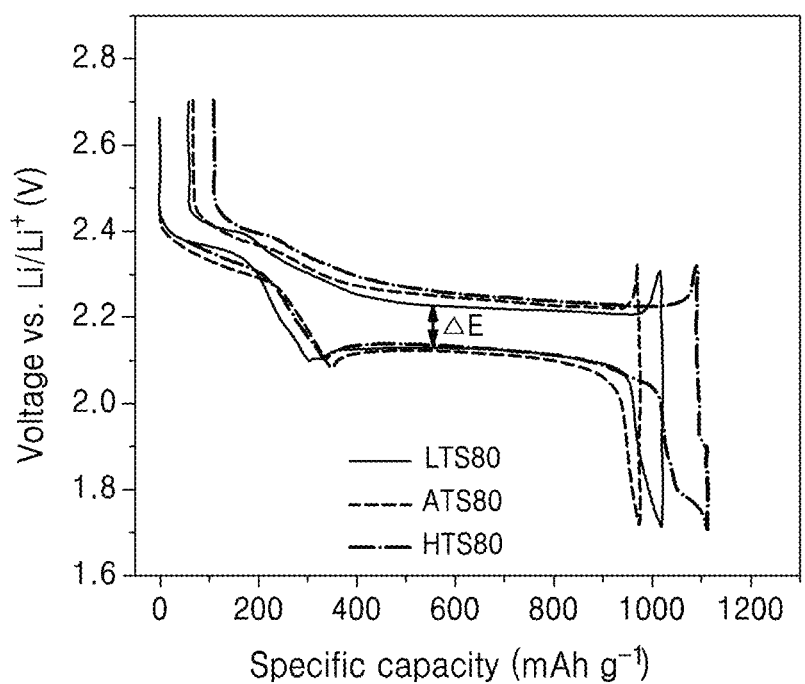
FIG. 14 shows the first discharge-charge profiles of LTS80, ATS80, and HTS80 at 0.05 C (1 C=1,000 mA g$^{-1}$) according to an example of the present disclosure.

The effect of LT was unveiled more clearly in comparison with AT and HT with the fixed sulfur content of 80 parts by weight (FIG. 12C and FIG. 12D). While LTS80, ATS80, and HTS80 exhibited similar discharge-charge profiles with reversible capacities of 1,023.5 mAh g$^{-1}$, 975.7 mAh g$^{-1}$, and 1,112.7 mAh g$^{-1}$, respectively, at 0.05 C, their capacity retentions after 300 cycles at 1 C were quite distinct, such as 82.3%, 69.1%, and 49.7%. Both the ATS80 and HTS80 gradually lost their capacities from the outset of the cycling, in sharp contrast with the LTS80. The specific capacities and charge-discharge profiles of the LTS80 at different C-rates are presented in FIG. 13A and FIG. 13B. The superior cyclability of LTS80 at the same content of sulfur can consistently be explained by the acidity of LT that mitigates the polysulfide dissolution by physisorption and chemisorption of the LiPS with the LT. In addition, LTS80 showed lower polarization at precycling than that of ATS80 and HTS80 (FIG. 14); while the polarization of the LTS80, marked with $\Delta$E in FIG. 14, was 0.101 V, those of the ATS80 and HTS80 were similarly 0.129 V. This observation may point to the fact that LTS80 contains relatively uniform sulfur domains as compared to those of the other control samples.

<Ex-situ Polysulfide Interaction Study>

Figure 15A:
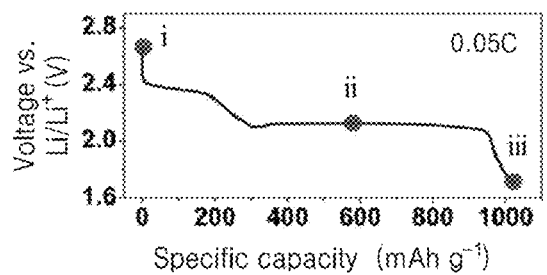
FIG. 15A shows ex-situ XPS spectra of LTS80 at different cycling points according to an example of the present disclosure.
Figure 15B:
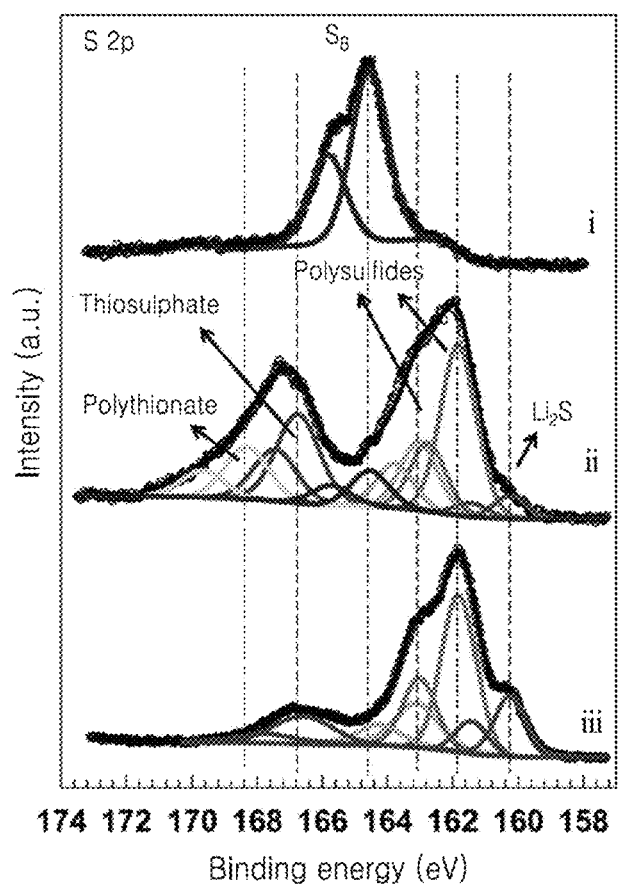
FIG. 15B shows ex-situ XPS spectra of LTS80 at different cycling points according to an example of the present disclosure.

The role of the acidity of the LT on the cycling performance was further elucidated by analyzing the LTS80 at different discharging points (FIG. 15A) using XPS. At pristine state (point i), two peaks at 164.5 eV and 165.7 eV were observed in S 2p branch, which reflect S—S bonds in S 2p$_{3/2}$ and S 2p$_{1/2}$ sub-regimes, respectively (FIG. 15B). More importantly, at point ii, the peaks at 166.7 eV and 167.5 eV assigned to thiosulfate as well as the peaks at 168.3 eV and 169.7 eV assigned to polythionates grew conspicuously, which is consistent with the spectra ii in FIG. 10A. The emergence of polythionates reflects the conversion of long-chain LiPS to short-chain LiPS through the sulfur polymerization of thiosulfate to polythionates, representing thiosulfate as a "polysulfide mediator". While the presence of LiPS was revealed by the S 2p$_{3/2}$ peaks at 161.8 eV and 163.1 eV corresponding to $S_T^{-1}$ and $S_B^0$, respectively, the integration of these two peaks indicated that the ratio between $S_T^{-1}$ and $S_B^0$ is 2:1, reconfirming the conversion from long-chain LiPS to short-chain LiPS in the plateau at 2.15 V. At the same time, the peak at 164.5 eV, a signature of elemental sulfur, still remained, implying that the sulfur was not fully converted to Li$_2$S$_8$. On the other hand, the spectrum at point iii indicates that the polythionates almost vanished, but the thiosulfate still remained to some extent. This phenomenon can be explained by the fact that the further reduction of the polythionates toward Li$_2$S$_2$ and Li$_2$S decreases the amount of polythionates while leaving some thiosulfate behind at the end of discharge. At point iii, the integration ratio of the peaks corresponding to $S_T^{-1}$ and $S_B^0$ was 2.25:1, indicating Li$_2$S$_2$ as the main product.

Figure 15C:
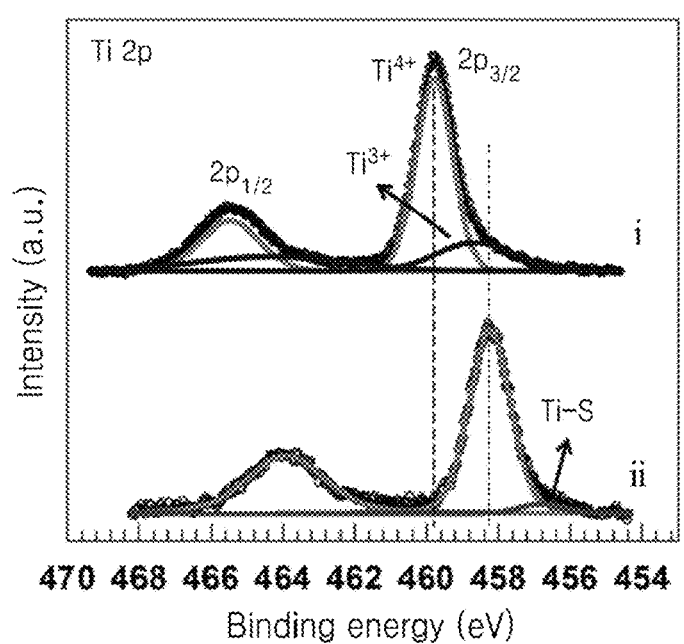
FIG. 15C shows ex-situ XPS spectra of LTS80 at different cycling points according to an example of the present disclosure.

The spectra in Ti 2p branch portray a consistent graph (FIG. 15C). As a result of the formation of the thiosulfate at point ii, the peak of Ti$^{4+}$ was down-shifted by 1.5 eV compared to that at point i. This peak shift was more significant than that (0.6 eV) in FIG. 10D during the experiment with the synthetic polysulfides. The greater peak shift in the actual battery cell is attributed to a more significant charge transfer to Ti, which also indicates that the improved cyclability of the LTS80 is associated with efficient formation of thiosulfate and polythionates via the charge transfer from LiPS to Ti of the LT nanosheets.

The above description of the present disclosure is provided for the purpose of illustration, and it would be understood by those skilled in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A metal oxide nanosheet-sulfur nanocomposite, comprising elemental sulfur nanoparticles chemically grown directly on each of exfoliated 2-dimensional metal oxide nanosheets,
    wherein the exfoliated metal oxide nanosheets comprise a nanosheet of titanium oxide selected from the group consisting of lepidocrocite, trititanate, tetratitanate, and pentatitanate.

2. The metal oxide nanosheet-sulfur nanocomposite of claim 1, wherein the exfoliated metal oxide nanosheets further comprise a nanosheet of oxide of metal selected from the group consisting of Co, Cu, Zn, Mn, V, Mo, and combinations thereof.

3. The metal oxide nanosheet-sulfur nanocomposite of claim 1, wherein the sulfur content is at least 80 parts by weight based on 100 parts by weight of the metal oxide nanosheet-sulfur nanocomposite.

4. A lithium-sulfur battery, comprising a sulfur cathode comprising the metal oxide nanosheet-sulfur nanocomposite according to claim 1.

5. The lithium-sulfur battery of claim 4, wherein the sulfur content is at least 80 parts by weight based on 100 parts by weight of the metal oxide nanosheet-sulfur nanocomposite.

6. The lithium-sulfur battery of claim 4, wherein dissolution of lithium polysulfide in the sulfur cathode is suppressed by the metal oxide nanosheet-sulfur nanocomposite.

7. The lithium-sulfur battery of claim 4, wherein the exfoliated metal oxide nanosheets further comprise a nanosheet of oxide of metal selected from the group consisting of Cu, Zn, V, Mo, and combinations thereof.

* * * * *